US 8,706,364 B2

(12) United States Patent
Shirao

(10) Patent No.: US 8,706,364 B2
(45) Date of Patent: Apr. 22, 2014

(54) WHEEL LOADER AND METHOD FOR CONTROLLING WHEEL LOADER

(75) Inventor: Atsushi Shirao, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/808,732

(22) PCT Filed: May 15, 2012

(86) PCT No.: PCT/JP2012/062349
§ 371 (c)(1),
(2), (4) Date: Jan. 7, 2013

(87) PCT Pub. No.: WO2013/145340
PCT Pub. Date: Oct. 3, 2013

(65) Prior Publication Data
US 2013/0259622 A1 Oct. 3, 2013

(30) Foreign Application Priority Data

Mar. 30, 2012 (JP) ................................. 2012-078941

(51) Int. Cl.
*G06F 7/70* (2006.01)
(52) U.S. Cl.
USPC ........................................................ 701/50
(58) Field of Classification Search
USPC .................................................. 701/50, 70
See application file for complete search history.

(56) References Cited

U.S. PATENT DOCUMENTS

| 2008/0234902 | A1* | 9/2008 | Johnson et al. ................. 701/50 |
| 2012/0310494 | A1 | 12/2012 | Asami et al. |
| 2013/0041561 | A1 | 2/2013 | Asami et al. |
| 2013/0073152 | A1* | 3/2013 | Harada et al. ................... 701/50 |

FOREIGN PATENT DOCUMENTS

| EP | 2 128 498 A1 | 12/2009 |
| JP | 7-229560 A | 8/1995 |
| JP | 2004-24172 A | 1/2004 |
| JP | 2008-144942 A | 6/2008 |
| JP | 2008-144942 A | 6/2008 |
| JP | 2011-63945 A | 3/2011 |
| WO | 2011/108353 A1 | 9/2011 |
| WO | 2011/138880 A1 | 11/2011 |

OTHER PUBLICATIONS

Extended European Search Report for the corresponding EP application No. 12832792.1 issued on Jul. 13, 2013.

* cited by examiner

*Primary Examiner* — Thomas Black
*Assistant Examiner* — Luke Huynh
(74) *Attorney, Agent, or Firm* — Global IP Counselors, LLP

(57) ABSTRACT

A traction force control section of a wheel loader, when the determination conditions are satisfied during traction force control, increases the maximum traction force. The determination conditions include that the aspect of operation is excavation, that the vehicle speed is less than or equal to a prescribed speed threshold value, that the amount of operation of the accelerator operating member is equal to or more than a prescribed accelerator threshold value, and that the amount of operation of the inching operating member is less than or equal to a prescribed inching operation threshold value.

17 Claims, 11 Drawing Sheets

WHEEL LOADER AND METHOD FOR CONTROLLING WHEEL LOADER

CROSS-REFERENCE TO RELATED APPLICATIONS

This application claims priority to Japanese Patent Application No. 2012-078941 filed on Mar. 30, 2012, the disclosure of which is hereby incorporated herein by reference in its entirety.

TECHNICAL FIELD

The present invention relates to a wheel loader and to a method for controlling a wheel loader.

BACKGROUND

Among wheel loaders, some are installed with a so called HST (Hydro Static Transmission). An HST type wheel loader, drives a hydraulic pump using an engine, and drives a hydraulic motor for travel using the hydraulic fluid ejected from the hydraulic pump. Because of this, the wheel loader travels. In such an HST type wheel loader, by controlling the engine rotational speed, the displacement of the hydraulic pump, the displacement of the hydraulic motor for travel, and the like, it is possible to control the vehicle speed and the traction force (see Japan Patent Laid-open Patent Publication JP-A- 2008-144942).

In the above wheel loader, an operator can select the execution of traction force control. In traction force control, for example, the displacement of the hydraulic motor for travel is restricted to an upper limit displacement that is less than the maximum displacement. Because of this, the maximum traction force is reduced. The operator, when the phenomena of slipping or stalling occur due to the traction force being too large, selects the execution of traction force control. Because of this, the maximum traction force is reduced, and the occurrence of the phenomena of slipping or stalling or the like is suppressed.

SUMMARY

Certain types of wheel loaders are configured so that an operator can select the level of the maximum traction force in traction force control. The operator selects in advance the level of the maximum traction force in traction force control. When an operator operates a switch fir executing traction force control, the maximum traction force is limited to the selected level. Because of this, an operator can, for example according to the condition of the road surface, select an appropriate level of the traction force, However, the required traction force during excavation operations is not constant, and the required traction three varies according to the conditions of the operation. Because of this, on that phenomena such as stalling or slipping or the like do not occur, it is not easy for an operator to select in advance what level of the maximum traction force is optimum. Therefore, in a wheel loader such as the above, every time the operating conditions change during an excavation operation, an operator has to select the level of the maximum traction force. Because of this, the operation becomes complex, and the operability of the wheel loader is lowered.

An object of the present invention is to provide a wheel loader and a method for controlling a wheel loader wherein it is possible to obtain sufficient traction force during excavation operations and also it is possible to suppress lowering of the operability.

A wheel loader according to a first aspect of the present invention is provided with a work implement, an engine, a hydraulic pump, a hydraulic motor for travel, an accelerator operating member, an inching operating member, a traction force control operating member, a vehicle speed detecting section, an aspect of operation determining section, a vehicle speed determining section, an accelerator operation determining section, an inching operation determining section, and a traction force control section. The work implement includes a boom and a bucket. The hydraulic pump is driven by the engine. The hydraulic motor for travel is driven by the hydraulic fluid ejected from the hydraulic pump. The accelerator operating member is operated for setting the target rotational speed of the engine. The inching operating member is operated for reducing the vehicle speed. The traction force control operating member is operated for switching ON or OFF the traction force control for reducing the maximum traction force. The vehicle speed detecting section detects the vehicle speed. The aspect of operation determining section determines whether or not the aspect of operation is excavation. The vehicle speed determining section determines whether or not the vehicle speed is less than or equal to a prescribed speed threshold value. The accelerator operation determining section determines whether or not the amount of operation of the accelerator operating member is equal to or more than a prescribed accelerator threshold value. The inching operation determining section determines whether or not the amount of operation of the inching operating member is less than or equal to a prescribed inching operation threshold value. The traction force control section, when the traction force control is in the ON state, reduces the maximum traction force compared to the maximum traction force when the traction force control is in the OFF state. The traction force control section, when the determination conditions are satisfied during traction force control, increases the maximum traction force. The determination conditions include the conditions that the aspect of operation is excavation, that the vehicle speed. is less than or equal to the prescribed speed threshold value, that the amount of operation of the accelerator operating member is equal to or more than the prescribed accelerator threshold value, and that the amount of operation of the inching operating member is less than or equal to the prescribed inching operation threshold value.

A wheel loader according to a second aspect of the present invention is the wheel loader according to the first aspect of the present invention further provided with a boom angle determining section. The boom angle determining section determines whether or not the boom angle is less than a prescribed angle threshold value. The boom angle is the angle of the boom with respect to the horizontal direction. The determination conditions further include the condition that the boom angle is less than the prescribed angle threshold value.

A wheel loader according to a third aspect of the present invention is the wheel loader according to the first aspect of the present invention wherein the determination conditions further include the condition that the duration time of the other conditions being satisfied is equal to or more than a. prescribed time threshold value.

A wheel loader according to a fourth aspect of the present invention is the wheel loader according to any one of the first to third aspects of the present invention wherein, the traction force control section sets a first level of the control level of the traction force. The maximum traction force of the first level is less than the maximum traction force when the traction force control is in the OFF state. The traction force control section, when the determination conditions are satisfied during traction force control, changes the control level of the maximum traction force to a second level. The maximum traction force of the second level is larger than the maximum traction force of the first level.

A wheel loader according to a fifth aspect of the present invention is the wheel loader according to the fourth aspect of the present invention wherein the maximum traction force of the second level is less than the maximum traction force when the traction force control is in the OFF state.

A wheel loader according to a sixth aspect of the present invention is the wheel loader according to the fourth aspect of the present invention further provided with a traction force level changing section for changing the magnitude of the maximum traction force of the first level.

A wheel loader according to a seventh aspect of the present invention is the wheel loader according to the fourth aspect of the present invention wherein, the traction force control section, when the determination conditions are no longer satisfied during the traction force control, reverts the control level of the traction force to the first level.

A wheel loader according to an eighth aspect of the present invention is the wheel loader according to the seventh aspect of the present invention wherein, the traction force control section, when changing the control level to the second level, changes the traction force more slowly than when reverting the control level of the traction force to the first level.

A wheel loader according to a ninth aspect of the present invention is the wheel loader according to the first aspect of the present invention wherein, the aspect of operation determining section, based on the traveling state of the vehicle and the operating state of the work implement, determines whether the aspect of operation is excavation or not.

A wheel loader according to a tenth aspect of the present invention is the wheel loader according to the first aspect of the present invention wherein, the traction force control section controls the displacement of the hydraulic motor for travel by controlling the angle of inclination of the hydraulic motor for travel. The traction force control section, by controlling the upper limit displacement of the hydraulic motor for travel, controls the maximum traction force.

A wheel loader according to a eleventh aspect of the present invention is the wheel loader according to the first aspect of the present invention wherein, the traction force control section, when the aspect of operation is not excavation, does not increase the maximum traction force.

A wheel loader according to a twelfth aspect of the present invention is the wheel loader according to the first aspect of the present invention wherein, the traction force control section, when the vehicle speed is not less than or equal to the prescribed speed threshold value, does not increase the maximum traction force.

A wheel loader according to a thirteenth aspect of the present invention is the wheel loader according to the first aspect of the present invention wherein, the traction force control section, when the amount of operation of the accelerator operating member is not equal to or more than the prescribed accelerator threshold value, does not increase the maximum traction force.

A wheel loader according to a fourteenth aspect of the present invention is the wheel loader according to the first aspect of the present invention wherein, the traction force control section, when the amount of operation of the inching operating member is not equal to or less than the prescribed inching operation threshold value, does not increase the maximum traction force.

A wheel loader according to a fifteenth aspect of the present invention is the wheel loader according to the second aspect of the present invention wherein, the traction force control section, when the boom angle is not less than the prescribed angle threshold value, does not increase the maximum traction force.

A wheel loader according to a sixteenth aspect of the present invention is the wheel loader according to the third aspect of the present invention wherein, the traction force control section, when the duration time is not equal to or more than the prescribed time threshold value, does not increase the maximum traction force.

A method for controlling according to the seventeenth aspect of the present invention is a method for controlling a wheel loader. The wheel loader is provided with, a work implement having a boom and a bucket, an engine, a hydraulic pump driven by the engine, a hydraulic motor for travel driven by the hydraulic fluid ejected from the hydraulic pump, an accelerator operating member operated for setting the target rotational speed of the engine, an inching operating member operated for reducing the vehicle speed, a traction force control operating member operated for switching ON or OFF the traction force control for reducing the maximum traction force. The controlling method according to the present aspect is provided with the following steps. A first step is a step of detecting the vehicle speed. A second step is a step of determining whether or not the aspect of operation is excavation. A third step is a step of determining whether or not the vehicle speed is less than or equal to a prescribed speed threshold value. A fourth step is a step of determining whether or not the amount of operation of the accelerator operating member is equal to or more than a prescribed accelerator threshold value A fifth step is a step of determining whether or not the amount of operation of the inching operating member is less than or equal to a prescribed inching operation threshold value. A sixth step is a step of reducing the maximum traction force when the traction force control is in the ON state compared to the maximum traction force when the traction force control is in the OFF state. A seventh step is a step of increasing the maximum traction force when the determination conditions are satisfied during the traction force control. The determination conditions include the conditions that the aspect of operation is excavation, that the vehicle speed is less than or equal to the prescribed speed threshold value, that the amount of operation of the accelerator operating member is equal to or more than the prescribed accelerator threshold value, and that the amount of operation of the inching operating member is less than or equal to the prescribed inching operation threshold value.

In the wheel loader according to the first aspect of the present invention, when the determination conditions are satisfied during the traction force control, the maximum traction force is automatically increased. The determination conditions include the conditions that the aspect of operation is excavation, that the vehicle speed is less than or equal to the prescribed speed threshold value, that the amount of operation of the accelerator operating member is equal to or more than the prescribed accelerator threshold value, and the amount of operation of the inching operating member is less than or equal to the prescribed inching operation threshold value. The vehicle speed being equal to or less than the prescribed speed threshold value and the amount of operation of the accelerator operating member being equal to or more than the prescribed accelerator threshold value mean that sufficient vehicle speed has not been achieved relative to the amount of operation of the accelerator operating member. For example, in spite of pressing down the accelerator pedal deeply, if the vehicle is in an almost stopped state, the above conditions are satisfied. The inching operating member is operated when an operator desires to reduce the vehicle speed without reducing the engine rotational speed. Because of this, the fact that the amount of operation of the inching operating member being less than or equal to the prescribed inching operation threshold value implies that an operator does not intend to reduce the vehicle speed. Therefore, when the determination conditions are satisfied, during an excavation operation, in spite of an operator operating the accelerator operating member wanting to obtain a large traction force, the wheel loader is in an almost stopped state. In a wheel loader according to the present aspect, by automatically increasing the maximum traction force in such a state, it becomes possible to obtain sufficient traction force during excavation operations. In addition, since it is not necessary for an operator to make operations for changing the level of the maximum traction force, it is possible to suppress reduction in the operability.

In the wheel loader according to the second aspect of the present invention, by determining whether or not the boom angle is less than the prescribed angle threshold value, the boom lowered state is detected. Because of this, the traction force control section, can determine whether the state is one in which a larger traction force is necessary.

In the wheel loader according to the third aspect of the present invention, by considering the duration time, it is possible to prevent the increase in the traction force over a short time being repeated frequently. Because of this, reductions in the operability of the wheel loader are suppressed.

In the wheel loader according to the fourth aspect of the present invention, by traction force control, the maximum traction force is reduced to the maximum traction force of the first level, Further, when the determination conditions are satisfied, the maximum traction force is automatically raised from the maximum traction force of the first level to the maximum traction force of the second level. Because of this, during excavation operations it is not only possible to obtain sufficient traction force but also possible to suppress reductions in the operability.

In the wheel loader according to the fifth aspect of the present invention, the maximum traction force of the second level is less than the maximum traction force than the maximum traction force in the state in which the traction force control is OFF. Therefore, when the determination conditions are satisfied, it is possible to prevent the maximum traction force from becoming excessively large In the wheel loader according to the sixth aspect of the present invention, because of traction force level changing section, it is possible to change the magnitude of the maximum traction force of the first level. Further, when the determination conditions are satisfied, the maximum traction force is automatically increased to a value larger than the maximum traction force of the first level. Because of this, an operator can, according to the operating conditions, set in more detail the necessary maximum traction force.

In the wheel loader according to the seventh aspect of the present invention, when the determination conditions are no longer satisfied during the traction three control, the maximum traction force is reverted to the maximum traction force of the first level. Because of this, it is possible to obtain an appropriate maximum traction force according to the operating conditions.

In the wheel loader according to the eighth aspect of the present invention, when increasing the maximum traction force, it is possible to suppress sudden increases in the maximum traction force. Because of this, it is possible to suppress the occurrence of slipping, or to suppress reductions in the operability. In addition, when reducing the maximum traction force, the traction force is reduced speedily. Because of this, for example, when the wheel loader is carrying out excavation if a state is entered in which the boom does not rise due to too large a traction force, it is possible to escape from such a state speedily.

In the wheel loader according to the ninth aspect of the present invention, based on the traveling state of the vehicle and the operating state of the work implement, it is possible to determine accurately whether or not the aspect of operation is excavation.

In the wheel loader according to the tenth aspect of the present invention, by controlling the upper limit displacement of the hydraulic motor for travel, it is possible to control the maximum traction force.

In the wheel loader according to the eleventh aspect of the present invention, when the aspect of operation is not excavation, since an increase in the traction force is not necessary, the maximum traction force during the normal traction force control is maintained.

In the wheel loader according to the twelfth aspect of the present invention, when the vehicle speed is not equal to or less than the prescribed speed threshold value, since an increase in the traction force is not necessary, the maximum traction force during the normal traction force control is maintained.

In the wheel loader according to the thirteenth aspect of the present invention, when the amount of operation of the accelerator operating member is not equal to or more than the prescribed accelerator threshold value, the above increasing the maximum traction force is not made. Because of this, when increasing the traction force is not required, the maximum traction force during the normal traction force control is maintained.

In the wheel loader according to the fourteenth aspect of the present invention, when the amount of operation of the inching operating member is not less than or equal to the prescribed inching operation threshold value, the above increasing the maximum traction force is not made. Because of this, when increasing the traction force is not required, the maximum traction force during the normal traction force control is maintained.

In the wheel loader according to the fifteenth aspect of the present invention, when the boom angle is not less than the prescribed angle threshold value, the above increasing the maximum traction force is not made. Because of this, when increasing the traction force is not required, the maximum traction force during the normal traction force control is maintained.

In the wheel loader according to the sixteenth aspect of the present invention, when the duration time is not equal to or more than the prescribed time threshold value, the above increasing the maximum traction force is not made. Because of this, it is possible to prevent the increase in the traction force over a short time being repeated frequently.

In the method for controlling the wheel loader according to the seventeenth aspect of the present invention, when the determination conditions are satisfied during the traction force control, the maximum traction force is automatically increased. The determination conditions include the conditions that the aspect of operation is excavation, that the vehicle speed is less than or equal to the prescribed speed threshold value, that the amount of operation of the accelerator operating member is equal to or more than the prescribed accelerator threshold value, and that the amount of operation of the inching operating member is less than or equal to the prescribed inching operation threshold value. The vehicle speed being equal to or less than the prescribed speed threshold value and the amount of operation of the accelerator operating member being equal to or more than the prescribed accelerator threshold value mean that sufficient vehicle speed has not been achieved relative to the amount of operation of the accelerator operating member. For example, in spite of pressing down the accelerator pedal deeply, if the vehicle is in an almost stopped state, the above conditions are satisfied. The inching operating member is operated when an operator desires to reduce the vehicle speed without reducing the engine rotational speed. Because of this, the fact that the amount of operation of the inching operating member being less than or equal to the prescribed inching operation threshold value implies that an operator does not intend to reduce the vehicle speed. Therefore, when the determination conditions are satisfied, during an excavation operation, in spite of an operator operating the accelerator operating member wanting to obtain a large traction force, the wheel loader is in an almost stopped state. In the method for controlling the wheel loader according to the present aspect, by automatically increasing the maximum traction force in such a state, it becomes possible to obtain sufficient traction force during excavation operations. in addition, since it is not necessary for an operator to make operations for changing the level of the maximum traction force, it is possible to suppress reductions in the operability.

BRIEF DESCRIPTION OF DRAWINGS

FIG. 13 is a flow chart shoving a processing for determining whether or not a boom pressure low flag is ON.

DESCRIPTION OF EMBODIMENTS

Figure 1:
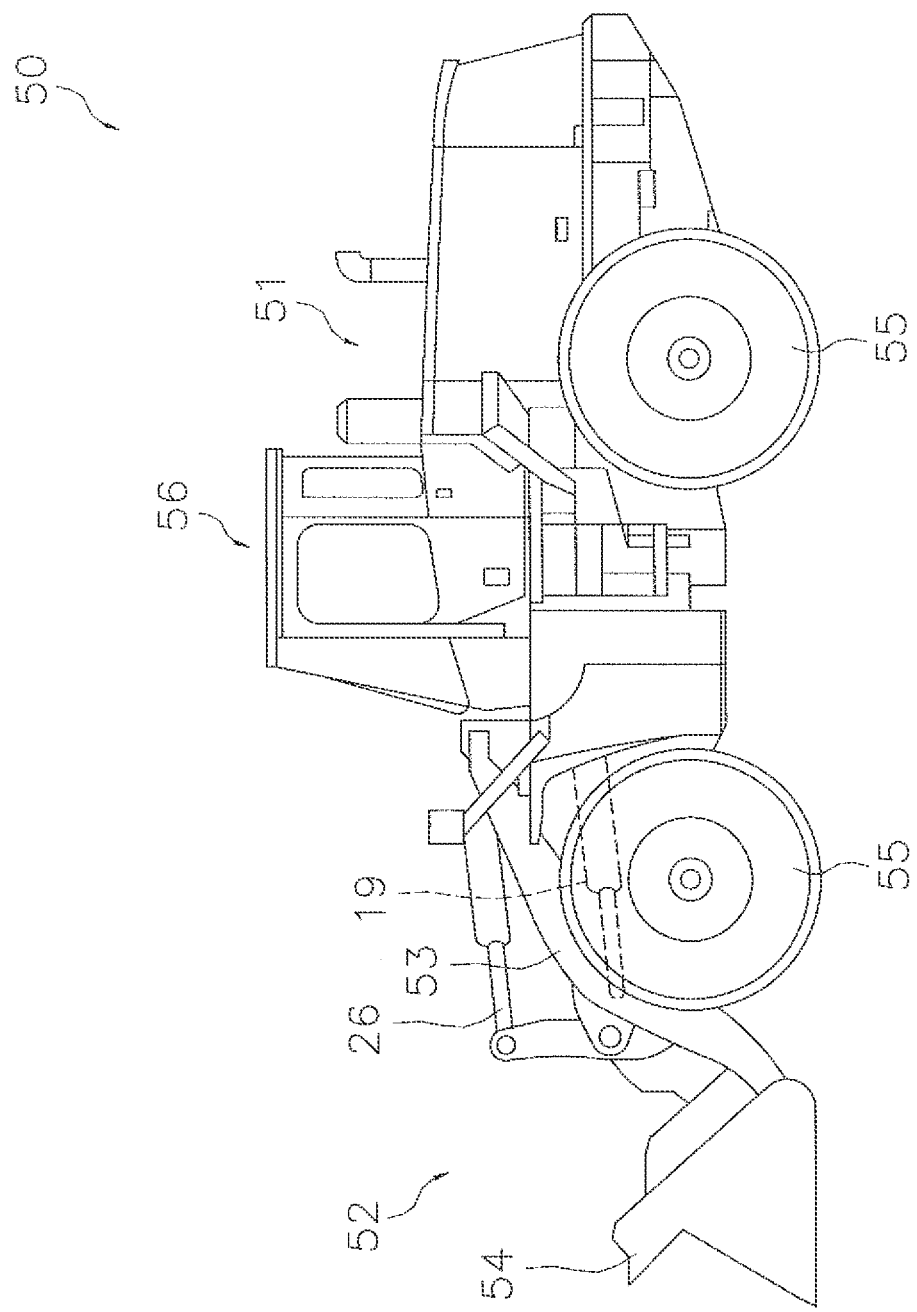
FIG. 1 is a side view drawing of a wheel loader according to an embodiment of the present invention.

In the following, a wheel loader 50 according to an embodiment of the present invention is explained with reference to the drawings. FIG. 1 is a side view drawing of a wheel loader 50 according to an embodiment of the present invention. The wheel loader 50 is provided with a vehicle body 51, a work implement 52, a plurality of tires 55, and a cab 56. The work implement 52 is mounted to the front part of the vehicle body 51. The work implement 52 has a boom 53, a bucket 554, a lifting cylinder 19, and a bucket cylinder 26. The boom 53 is a member for lifting up the bucket 54. The boom 53 is driven by the lifting cylinder 19. The bucket 54 is attached to the front end of the boom 53. The bucket 54 is dumped and tilted by the bucket cylinder 26. The cab 56 is placed on the vehicle body 51.

Figure 2:
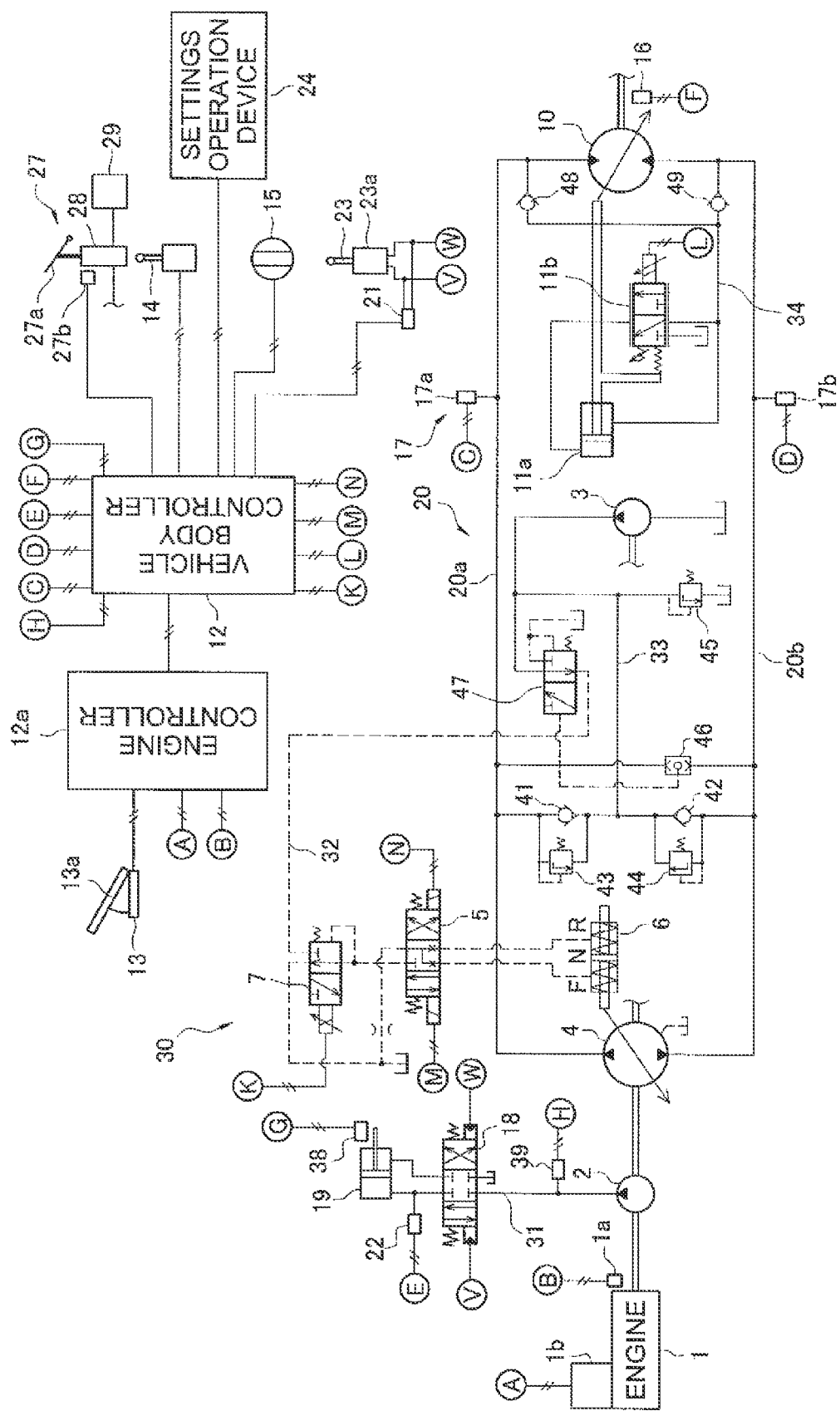
FIG. 2 is a block diagram showing a configuration of a hydraulic drive mechanism installed in the wheel loader.

FIG. 2 is a block diagram showing the configuration of a hydraulic drive mechanism 30 installed in the wheel loader 50. The hydraulic drive mechanism 30 mainly includes; an engine 1, a first hydraulic pump 4, a second hydraulic pump 2, a charge pump 3, a hydraulic motor 10 for travel, an engine controller 12a, a vehicle body controller 12, and a drive hydraulic circuit 20. In the hydraulic drive mechanism 30, the first hydraulic pump 4, because of being driven by the engine 1, ejects the hydraulic fluid. The hydraulic motor 10 for travel is driven by the hydraulic fluid ejected from the first hydraulic pump 4. Further, the wheel loader 50 travels because of the hydraulic motor 10 for travel rotationally driving the above tires 55. In other words, in the hydraulic drive mechanism 30, the so called 1-pump 1-motor type HST system has been adopted.

The engine 1 is a diesel type engine, and the output torque generated by the engine 1 is transmitted to the second hydraulic pump 2, the charge pump 3, the first hydraulic pump 4, and the like. In the hydraulic drive mechanism 30, an engine rotational speed sensor 1a that detects the actual rotational speed of the engine 1 is provided, in addition, to the engine 1, a fuel injection device 1b is connected. An engine controller 12a to be described later, by controlling the fuel injection device 1b, controls the output torque (hereinafter referred to as "engine torque") and the rotational speed of the engine 1.

The first hydraulic pump 4, because of being driven by the engine 1, ejects hydraulic fluid. The first hydraulic pump 4 is a variable displacement type hydraulic pump. The hydraulic fluid ejected from the first hydraulic pump 4 is sent to the hydraulic motor 10 for travel through the drive hydraulic circuit 20. In concrete terms, the drive hydraulic circuit 20 has a first drive circuit 20a and a second drive circuit 20b. Because of the hydraulic fluid being supplied from the first hydraulic pump 4 to the hydraulic motor 10 for travel via the first drive circuit 20a, the hydraulic motor 10 for travel is driven in one direction (for example the forward direction). Because of the hydraulic fluid being supplied from the first hydraulic pump 4 to the hydraulic motor 10 for travel via the second drive circuit 20a, the hydraulic motor 10 for travel is driven in the other direction (for example the reverse direction).

In the drive hydraulic circuit 20 is provided a drive circuit pressure detecting section 17. The drive circuit pressure detecting section 17 detects the pressure of the hydraulic fluid (hereinafter referred to as the "drive circuit pressure") supplied to the hydraulic motor 10 for travel via the first drive circuit 20a or the second drive circuit 20b. In specific terms, the drive circuit pressure detecting section 17 has a first drive circuit pressure sensor 17a and a second drive circuit pressure sensor 17b. The first drive circuit pressure sensor 17a detects the hydraulic pressure of the first drive circuit 20a. The second drive circuit pressure sensor 17b detects the hydraulic pressure of the second drive circuit 20b. The first drive circuit pressure 17a and the second drive circuit pressure sensor 17b transmit the detected signals to the vehicle body controller 12. Further, to the first hydraulic pump 4 are connected an FR switching section 5 for controlling the direction of ejection of the first hydraulic pump 4 and a pump displacement controlling cylinder 6.

The FR switching section 5 is a solenoid controlled valve that switches the direction of supply of the hydraulic fluid to the pump displacement controlling cylinder 6 based on the control signal from the vehicle body controller 12. The FR switching section 5, by switching the direction of supply of the hydraulic fluid to the pump displacement controlling cylinder 6, switches the direction of ejection by the first hydraulic pump 4. In concrete terms, the FR switching section 5 switches the direction of ejection of the first hydraulic pump 4 between ejection to the first drive circuit 20a and ejection to the second drive circuit 20b. Because of this, the drive direction of the hydraulic motor 10 for travel is changed. The pump displacement controlling cylinder 6 is driven by the hydraulic fluid being supplied via a pump pilot circuit 32, and changes the tilting angle of the first hydraulic pump 4.

In the pump pilot circuit 32 is placed a pump displacement controlling section 7. The pump displacement controlling section 7 connects the pump displacement control cylinder 6 to either one of the pump pilot circuit 32 and the hydraulic fluid tank. The pump displacement controlling section 7 is a solenoid controlled valve which is controlled based on the control signal from the vehicle body controller 12. The pump displacement controlling section 7, by controlling the pressure of the hydraulic fluid inside the pump displacement controlling cylinder 6, adjusts the tilting angle of the first hydraulic pump 4.

The pump pilot circuit 32 is connected via a cutoff valve 47 to a charging circuit 33 and a hydraulic fluid tank. The pilot port of the cutoff valve 47 is connected via a shuttle valve 46 to the first drive circuit 20a and the second drive circuit 20b. The shuttle valve 46 guides the larger of the hydraulic pressure of the first drive circuit 20a and the hydraulic pressure of the second drive circuit 20b to the pilot port of the cutoff valve 47. In other words, the drive circuit pressure is applied to the pilot port of the cutoff valve 47. The cutoff valve 47, when the drive circuit pressure is lower than a prescribed cutoff pressure, connects together the charging circuit 33 and the pump pilot circuit 32. Because of this, the hydraulic fluid is supplied from the charging circuit 33 to the pump pilot circuit 32. The cutoff valve 47, when the drive circuit pressure becomes higher than the prescribed cutoff pressure, connects together the pump pilot circuit 32 and the hydraulic fluid tank and lets the hydraulic fluid of the pump pilot circuit 32 escape to the hydraulic fluid tank. Because of this, due to the hydraulic pressure of the pump pilot circuit 32 decreasing, the displacement of the first hydraulic pump 4 is reduced, and any rise in the drive circuit pressure is suppressed.

The charging pump 3, is driven by the engine 1, and is a pump for supplying hydraulic fluid to the drive hydraulic circuit 20. The charging pump 3 is connected to the charging circuit 33. The charging pump 3 supplies hydraulic fluid to the pump pilot circuit 32 via the charging circuit 33. The charging circuit 33 is connected to the first drive circuit 20a via a first check valve 41. The first check valve 41, although permits the flow of hydraulic fluid from the charging circuit 33 to the first drive circuit 20a, restricts the flow of hydraulic fluid to the charging circuit 33 from the first drive circuit 20a. The charging circuit 33 is connected to the second drive circuit 20b via a second check valve 42. The second check valve 42, although permits the flow of hydraulic fluid from the charging circuit 33 to the second drive circuit 20b, restricts the flow of hydraulic fluid to the charging circuit 33 from the second drive circuit 20b. Further, the charging circuit 33 is connected to the first drive circuit 20a via a first relief valve 43. The first relief valve 43 is opened when the hydraulic pressure of the first drive circuit 20a becomes higher than a prescribed pressure. The charging circuit 33 is connected to the second drive circuit 20b via a second relief valve 44. The second relief valve 44 is opened when the hydraulic pressure of the second drive circuit 20b becomes higher than a prescribed pressure. In addition, the charging circuit 33 is connected to the hydraulic fluid tank via a low pressure relief valve 45. The low pressure relief valve 45 is opened when the hydraulic pressure of the charging circuit 33 becomes larger than a prescribed relief pressure. Because of this, the drive circuit pressure is adjusted so that it does not exceed the prescribed relief pressure. Further, the prescribed relief pressure of the low pressure relief valve 45 is considerably low, compared to the relief pressure of the first relief value 43, and to the relief pressure of the second relief valve 44. Therefore, when the drive circuit pressure becomes lower than the hydraulic pressure of the charging circuit 33, via the first check valve 41 or the second check valve 42, the hydraulic fluid is supplied from the charging circuit 33 to the drive hydraulic circuit 20.

The second hydraulic pump 2 is driven by the engine 1. The hydraulic fluid ejected from the second hydraulic pump 2 is supplied to the lifting cylinder 19 via the hydraulic circuit 31 for the work implement. Because of this, the work implement 52 is driven. The ejection pressure of the second hydraulic pump 2 is detected by the ejection pressure sensor 39. The ejection pressure sensor 39 sends the detected signal to the vehicle body controller 12, The hydraulic circuit 31 for the work implement is provided with a work implement control valve 18. The work implement control valve 18 is driven according to the amount of operation of the work implement operating member 23. The work implement control valve 18 is driven according to the pilot pressure applied to the pilot port. The work implement control valve 18, according to the pilot pressure applied to the pilot port, controls the flow rate of the hydraulic fluid supplied to the lifting cylinder 19. The pilot pressure applied to the pilot port of the work implement control valve 18 is controlled by the pilot valve 23a of the work implement operating member 23. The pilot valve 23a applies a pilot pressure according to the amount of operation of the work implement operating member 23 to the pilot port of the work implement control valve 18. Because of this, the lifting cylinder 19 is controlled according to the amount of operation of the work implement operating member 23. The pilot pressure applied to the pilot port of the work implement control valve 18 is detected by the PPC pressure sensor 21. In addition, the pressure of the hydraulic fluid supplied to the lifting cylinder 19 is detected by a boom pressure sensor 22. The PPC pressure sensor 21 and the boom pressure sensor 22 send the detected signals to the vehicle body controller 12, Further, in the lifting cylinder 19 is provided a boom angle detection section 38. The boom angle detection section 38 detects the boom angle described later. The boom angle detection sensor 38 is a sensor that detects the angle of rotation of the boom 53. Or else, the boom angle detection sensor 38 can detect the amount of stroke of the lifting cylinder 19, and can compute the angle of rotation of the boom 53 from the amount of stroke. The boom angle detection section 38 sends the detected signal to the vehicle body controller 12. Further, even the bucket cylinder 26, similar to the lifting cylinder 19, is controlled by a control valve, but this has not been shown in FIG. 2.

The hydraulic motor 10 for travel is a variable displacement type hydraulic motor. The hydraulic motor 10 for travel is driven by the hydraulic fluid ejected from the first hydraulic pump 4, and generates the driving force for travel. In the hydraulic motor 10 for travel are provided a motor cylinder 11a and a motor displacement controlling section 11b. The motor cylinder 11a varies the angle of inclination of the hydraulic motor 10 for travel. The motor displacement controlling section 1ib is an electromagnetically controlled valve that is controlled based on the control signal from the vehicle body controller 12. The motor displacement controlling section 11b, controls the motor cylinder 11a based on the control signal from the vehicle body controller 12. The motor cylinder 11a and the motor displacement controlling section 11b are connected to the motor pilot circuit 34. The motor pilot circuit 34 is connected to the first drive circuit 20a via a check valve 48. The check valve 48, although permits the flow of the hydraulic fluid from the first drive circuit 20a to the motor pilot circuit 34, restricts the flow of the hydraulic fluid from the motor pilot circuit 34 to the first drive circuit 20a. The motor pilot circuit 34 is connected to the second drive circuit 20b via a check valve 49. The check valve 49, although permits the flow of the hydraulic fluid from the second drive circuit 20b to the motor pilot circuit 34, restricts the flow of the hydraulic fluid from the motor pilot circuit 34 to the second drive circuit 20b. Because of the check valves 48 and 49, the hydraulic fluid having the larger pressure of the first drive circuit 20a and the second drive circuit 20b is supplied to the motor pilot circuit 34, The motor displacement controlling section 11b, based on the control signal from the vehicle body controller 12, switches the direction of supply and the supply flow rate of the hydraulic fluid from the motor pilot circuit 34 to the motor cylinder 11a. Because of this, the vehicle body controller 12 can freely vary the displacement of the hydraulic motor 10 for travel. In addition, it is possible to set freely the maximum displacement and the minimum displacement of the hydraulic motor 10 for travel.

A vehicle speed sensor 16 is provided in the hydraulic drive mechanism 30. The vehicle speed sensor 16 detects the vehicle speed. The vehicle speed sensor 16 transmits the vehicle speed signal to the vehicle body controller 12. The vehicle speed sensor 16 detects the vehicle speed, for example, by detecting the rotational speed of the tire driving axle. The vehicle speed sensor 16 is an example of the vehicle speed detecting section of the present invention.

The wheel loader 50 is provided with an accelerator operating member 13a, a forward-reverse selection operating member 14, a traction force control operating member 15, an inching operating member 27, and a settings operating device 24.

The accelerator operating member 13a is a member for an operator to set the target rotational speed of the engine 1. The accelerator operating member 13a, for example, is an accelerator pedal, and is operated by an operator. The accelerator operating member 13a is connected to the accelerator operation amount sensor 13. The accelerator operation amount sensor 13 is configured from a potentiometer or the like. The accelerator operation amount sensor 13 transmits a detection signal indicating the amount of operation (hereinafter referred to as the accelerator operation amount) of the accelerator operating member 13a to the engine controller 12a. The operator, by adjusting the acceleration operation amount, can control the rotational speed of the engine 1.

The forward-reverse selection operating member 14 is, operated by an operator, and is selected among the forward travel position, the reverse travel position, and the neutral position. The forward-reverse selection operating member 14 sends a detection signal indicating the position of the forward reverse-selection operating member 14 to the vehicle body controller 12. The operator, by operating the forward-reverse selection operating member 14, can switch between the forward travel and reverse travel of the wheel loader 50

The traction force control operating member 15 is, for example, a switch. The traction force control operating member 15, is operated by an operator, and is operated for switching ON or OFF the traction force control. The traction force control is a control for lowering the maximum traction force of the wheel loader 50. The maximum traction force is the value when the traction force (see FIG. 6) that changes according to the vehicle speed becomes a peak. Further, in the following explanations, the traction force control being in the OFF state means the state in which the traction force control is not being executed. In addition, the traction force control being in the ON state means the state in which the traction force control is being executed. The traction force control is explained in detail later. The traction force control operating member 15 sends a detection signal indicating the selected position of the traction force control operating member 15 to the vehicle body controller.

The inching operation section 27 includes an inching operating member 27a and an inching operation sensor 27b. The inching operating member 27a is operated by an operator. The inching operating member 27a is, for example a pedal. The inching operating member 27a simultaneously has the inching operation function described later and the brake operation function. The inching operation sensor 27b detects the amount of operation (hereinafter referred to as the "inching operation amount") of the inching operating member 27a, and transmits the detected signal to the vehicle body controller 12. When the inching operating member 27a is operated, the vehicle body controller 12, based on the detected signal from the inching operation sensor 27b, controls the pump displacement controlling section 7. The vehicle body controller 12 reduces the hydraulic pressure of the pump pilot circuit 32 according to the amount of operation of the inching operating member 27a. Because of this, the drive circuit pressure decreases, and the rotational speed of the hydraulic motor 10 for travel decreases. The inching operation section 27 is used, for example when wanting to raise the rotational speed of the engine 1 but wanting to suppress any increase in the speed of travel, or in other situations. In other words, when the rotational speed of the engine 1 is increased by an operation of the accelerator operating member 13a, even the hydraulic pressure of the pump pilot circuit 32 gets increased. At this time, by operating the inching operating member 27a, it is possible to control the rise of the hydraulic pressure of the pump pilot circuit 32. Because of this, any increase in the displacement of the first hydraulic pump 4 is suppressed, and it is possible to suppress the rise of the rotational speed of the hydraulic motor 10 for travel. In other words, the inching operating member 27a is operated for reducing the vehicle speed or the traction force without reducing the engine rotational speed.

In addition, to the inching operating member 27a is coupled a brake valve 28. The brake valve 28 controls the supply of the hydraulic fluid to the hydraulic braking device 29. The inching operating member 27a is also an operating member for the hydraulic braking device 29. Until the amount of operation of the inching operating member 27a reaches a prescribed amount, only the inching operation described above is carried out based on the detected signal from the inching operation sensor 27b. Next, when the amount of operation of the inching operating member 27a reaches the prescribed amount, the operation of the brake valve 28 is started, and because of this a braking force is generated in the hydraulic braking device 29. When the amount of operation of the inching operating member 27a is more than a prescribed amount, the braking force of the hydraulic braking device 29 is controlled according to the amount of operation of the inching operating member 27a.

The settings operation device 24 is a device fir carrying out various settings of the wheel loader 50. The settings operation device 24 is, for example, a display device with a touch panel. As is described later, during the traction force control, the control level of the traction force is set to a first level. The maximum traction force of the first level is less than the maximum traction force in the state in which the traction force control is in the OFF state. The operator, by operating the settings operation device 24, can select and set the maximum traction force of the first level during the traction force control from plural steps of levels. The settings operation device 24 is an example of a traction force level changing section for changing the magnitude of the maximum traction force of the first level.

Figure 3:
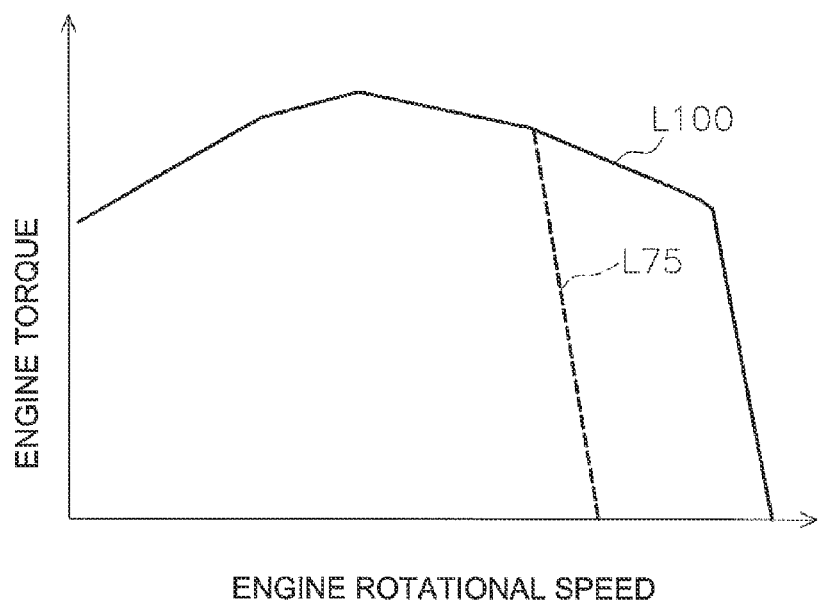
FIG. 3 is a drawing showing an output torque curve of an engine.

The engine controller 12a is an electronic control section having an operational device such as a CPU or the like, and various memories, and so on. The engine controller 12a controls the engine 1 so that the set target rotational speed is obtained. The output torque curve of the engine 1 is shown in FIG. 3. The output torque curve of the engine 1 shows the relationship between the rotational speed of the engine 1 and the magnitude of the maximum output torque that the engine 1 can output at each rotational speed. In FIG. 3, the continuous line L100 shows the engine output torque curve when the accelerator operation amount is 100%. This engine output torque curve, for example corresponds to the rating or the maximum power output of the engine 1. Further, the accelerator operation amount being 100% implies the state in which the accelerator operating member 13a has been operated to the maximum extent. Further, the broken line L75 shows the engine output torque curve when the accelerator operation amount is 75%. The engine controller 12a controls the output of the engine 1 so that the engine torque is below the engine output torque curve. This control of the output of the engine 1 can be carried out, for example, by controlling the upper limit value of the amount of fuel injected into the engine 1.

The vehicle body controller 12 is an electronic control section having an operational device such as a CPU or the like, and various memories, and so on. The vehicle body controller 12, by carrying out electronic control of the control valves based on the output signals from the detection sections, controls the displacement of the first hydraulic pump 4 and the displacement of the hydraulic motor 10 for travel.

Figure 4:
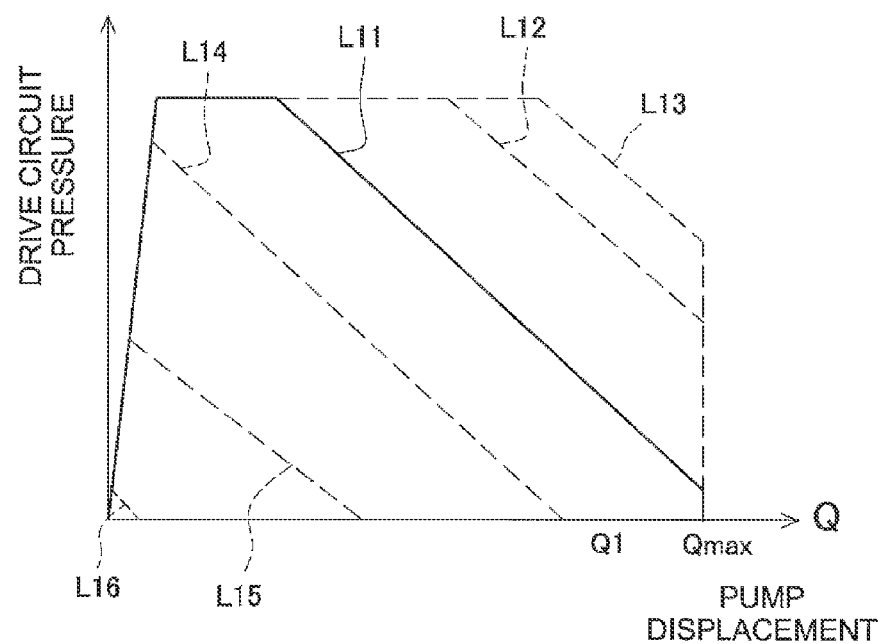
FIG. 4 is a drawing showing an example of a pump displacement-drive circuit pressure characteristics.

In concrete terms, the vehicle body controller 12, outputs a command signal to the pump displacement controlling section 7 based on the engine rotational speed detected by the engine rotational speed sensor 1a. Because of this, the relationship between the pump displacement and the drive circuit pressure is established. In FIG. 4, an example is shown of the pump displacement-drive circuit pressure characteristics. The pump displacement-drive circuit pressure characteristics show the relationship between the pump displacement and the drive circuit pressure. L11 to L16 in the figure are lines showing the pump displacement-drive circuit pressure characteristics which are varied according to the engine rotational speed. In concrete terms, because of the vehicle body controller 12 controlling the flow rate of the pump displacement controlling section 7 based on the engine rotational speed, the pump displacement-drive circuit pressure characteristics are changed among L11 to L16. Because of this, the pump displacement is controlled according to the engine rotational speed and is controlled to a magnitude corresponding to the drive circuit pressure.

Figure 5:
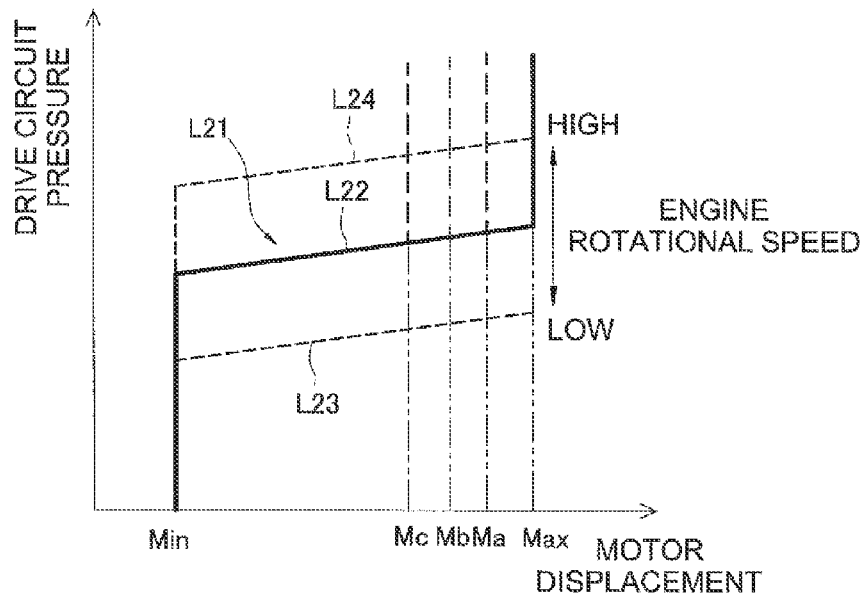
FIG. 5 is a drawing showing an example of a motor displacement-drive circuit pressure characteristics.
Figure 6:
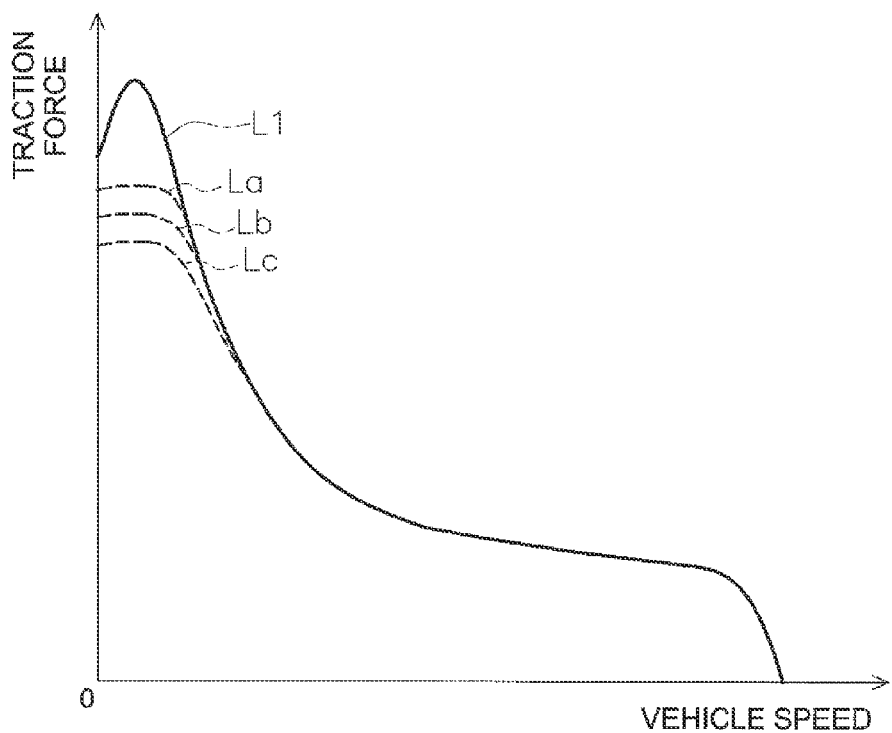
FIG. 6 is a drawing showing an example of a vehicle speed-traction force curve diagram of the wheel loader.

The vehicle body controller 12 processes the output signals from the engine rotational speed sensor 1a and the drive circuit pressure detecting section 17, and outputs the command signal for motor displacement to the motor displacement controlling section 11b. Here, the vehicle body controller 12 refers to the pump displacement-drive circuit pressure characteristics stored in the vehicle body controller 12, and sets the motor displacement from the value of the engine rotational speed and the value of the drive circuit pressure. The vehicle body controller 12 outputs to the motor displacement control section 11b a change command for the angle of inclination corresponding to this set motor displacement. In FIG. 5 is shown an example of the motor displacement drive circuit pressure characteristics. The continuous line L21 in the figure is a line determining the motor displacement corresponding to the drive circuit pressure in a state in which the engine rotational speed has a certain value. The motor displacement here corresponds to the angle of inclination of the hydraulic motor 10 for travel. The angle of inclination is a minimum (Min) when the drive circuit pressure is until below a certain value. After that, even the angle of inclination gradually becomes larger as the drive circuit pressure increases (the inclined portion L22 of the continuous line). Further, after the angle of inclination has become a maximum (Max), the angle of inclination maintains its maximum angle of inclination Max even if the drive circuit pressure increases. The inclined portion L22 stipulates the target pressure of the drive circuit pressure. In other words, the vehicle body controller 12 increases the displacement of the hydraulic motor for travel when the drive circuit pressure is larger than the target pressure. Also, when the drive circuit pressure becomes less than the target pressure, the displacement of the hydraulic motor for travel is reduced. The target pressure is determined according to the engine rotational speed. In other words, the setting is made so that the inclined portion L22 shown in FIG. 4 goes up or down according to whether the engine rotational speed increases or decreases. In concrete terms, the inclined portion L22 is controlled so that if the engine rotational speed is low, the angle of inclination becomes large from a state of lower drive circuit pressure, and the maximum angle of inclination is reached in a state of lower drive circuit pressure (see the inclined portion L23 of the broken line in the lower part of FIG. 5). On the contrary, if the engine rotational speed is high, the control is carried out so that the minimum angle of inclination Min is maintained until the drive circuit pressure becomes much higher, and the maximum angle of inclination Max is reached in a state of still higher drive circuit pressure (see the inclined portion L24 of the broken line in the upper part of FIG. 5). Because of this, as is shown in FIG. 6, the traction force and the vehicle speed of the wheel loader 50e can be varied in a stepless manner, and it is possible to change the speed automatically from zero vehicle speed to the maximum vehicle speed without carrying out any gear changing operation. Further, in FIG. 5, in order to make the understanding easy, although the inclined portion of the L22 has been emphasized, in actuality, this line is substantially horizontal. Therefore, when the drive circuit pressure reaches the target pressure, the motor displacement is switched between the minimum value (or the minimum limit value) and the maximum value (or the maximum limit value). However, when the drive circuit pressure reaches the target pressure, the instruction value is not changed immediately, but a time delay is present. This time delay is the reason for the presence of the inclined portion L22.

The vehicle body controller 12, because of the traction force control operating member 15 being operated, carries out the traction force control. The vehicle body controller 12, by changing the upper limit displacement of the hydraulic motor 10 for travel, changes the maximum traction force of the vehicle. For example, as is shown in FIG. 5, so as to change the upper limit displacement from Max to any one of Ma, Mb, and Mc, the vehicle body controller 12 outputs an instruction signal to the motor displacement controlling section 11b. When the upper limit displacement is changed to Ma, the vehicle speed-traction force characteristics change as indicated by the line La in FIG. 6. In this manner, the maximum traction force decreases compared to the line L1 indicating the vehicle speed-traction three characteristics in the state in which the traction force control is not being carried out. When the upper limit displacement is changed to Mb, the vehicle speed-traction three characteristics change as indicated by the line Lb, and the maximum traction force decreases further. In addition, when the upper limit displacement is changed to Mc, the vehicle speed-traction force characteristics change as indicated by the line Lc, and the maximum traction force decreases further.

In the traction force control, the maximum traction tierce of the vehicle is reduced to the maximum traction force of a first level that has been set in advance. Using the settings operation device 24 described above, it is possible to select and set the magnitude of the maximum traction force of the first level from a plurality of levels during the traction force control. In concrete terms, the settings operation device 24 can select the level to be set as the first level from among the three levels of level A, level B, and level C. Level A, is the level of the traction force corresponding to the upper limit displacement Ma described above. Level B, is the level of the traction force corresponding to the upper limit displacement Mb described above. Level C, is the level of the traction force corresponding to the upper limit displacement Mc described above.

Figure 7:
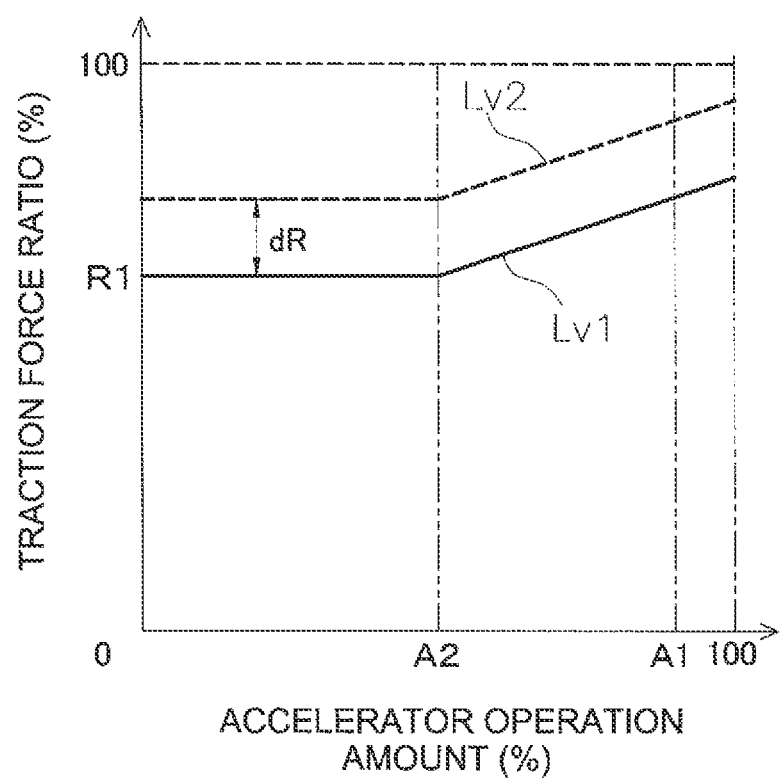
FIG. 7 is a drawing showing an example of a traction force ratio information.

FIG. 7 shows the traction force ratio information that stipulates the relationship between the traction force ratio and the accelerator operation amount. The traction force ratio is the ratio of the maximum traction force during the traction force control when the maximum traction force in the state in which the traction force control is OFF is taken as 100%. In FIG. 7, Lv1 is the traction force ratio information of the first level (hereinafter referred to as the "first traction force ratio information"). in the first traction force ratio information Lv1, when the accelerator operation amount is equal to or less than a prescribed threshold value A2, the traction force ratio is constant at R1. When the accelerator operation amount is more than the prescribed threshold value A2, the traction force ratio increases according to the accelerator operation amount. The vehicle body controller 12, when the control level of the traction force during the traction force control is set to the first level, carries out control of the upper limit displacement of the hydraulic motor 10 for travel so that a maximum traction force such as that shown in the first traction force ratio information Lv11 is obtained.

The vehicle body controller 12, when a prescribed condition is satisfied during the traction force control, changes the control level of the traction force from the first level to a second level. In FIG. 7, Lv2 is the traction force ratio information of the second level (hereinafter referred to as the "second traction force ratio information"). The traction force ratio of the second level Lv2 is larger than the traction force ratio of the first level Lv1. The traction force ratio of the second level Lv2 is larger than the traction force ratio of the first level Lv1 by a prescribed amount of change dR. The amount of change dR is preferably 5% or more and less than or equal to 15%. The amount of change dR, for example, is 10%. The vehicle body controller 12, when a prescribed condition is satisfied during the traction force control, carries out control of the upper limit displacement of the hydraulic motor 10 for travel so that a maximum traction force such as that shown in the first traction force ratio information Lv2 is obtained. Because of this, the maximum traction force is increased automatically. In the following, the determination processing for automatically increasing the maximum traction force during the traction force control is explained in detail.

Figure 8:
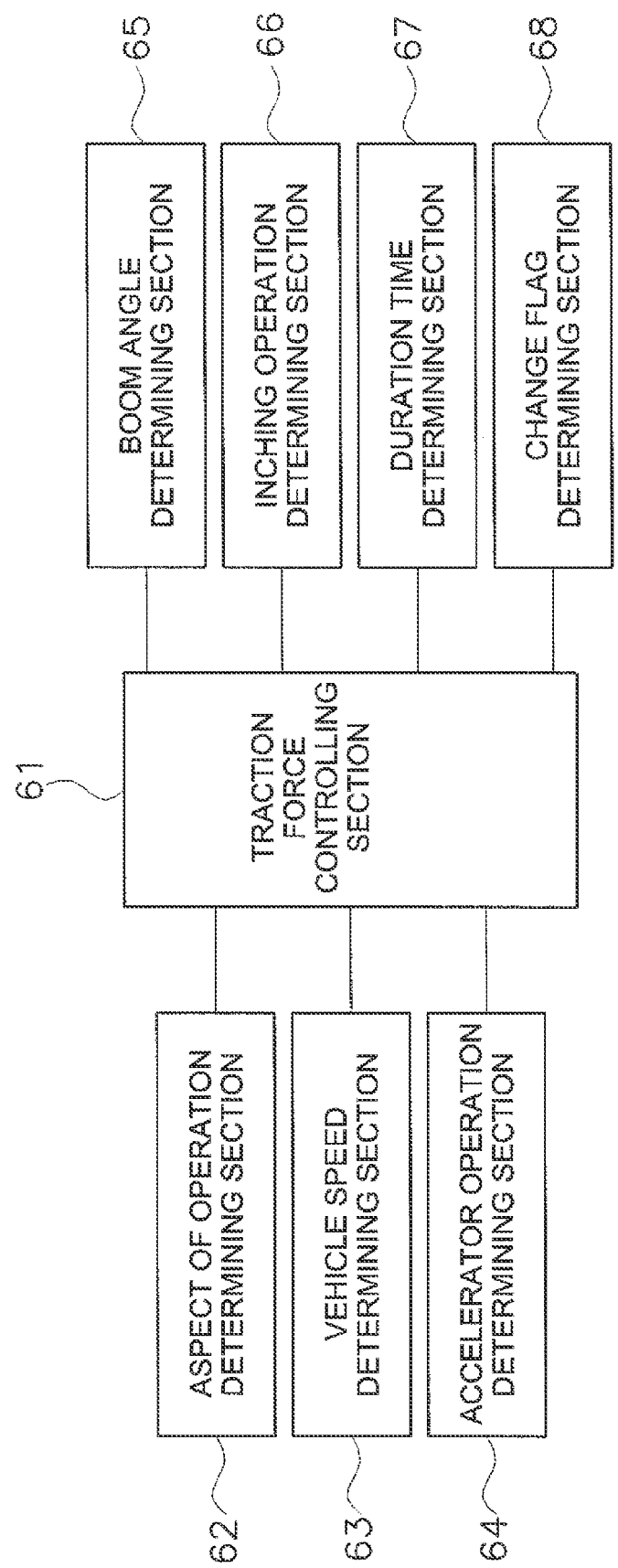
FIG. 8 is a block diagram showing a configuration of a vehicle body controller.
Figure 9:
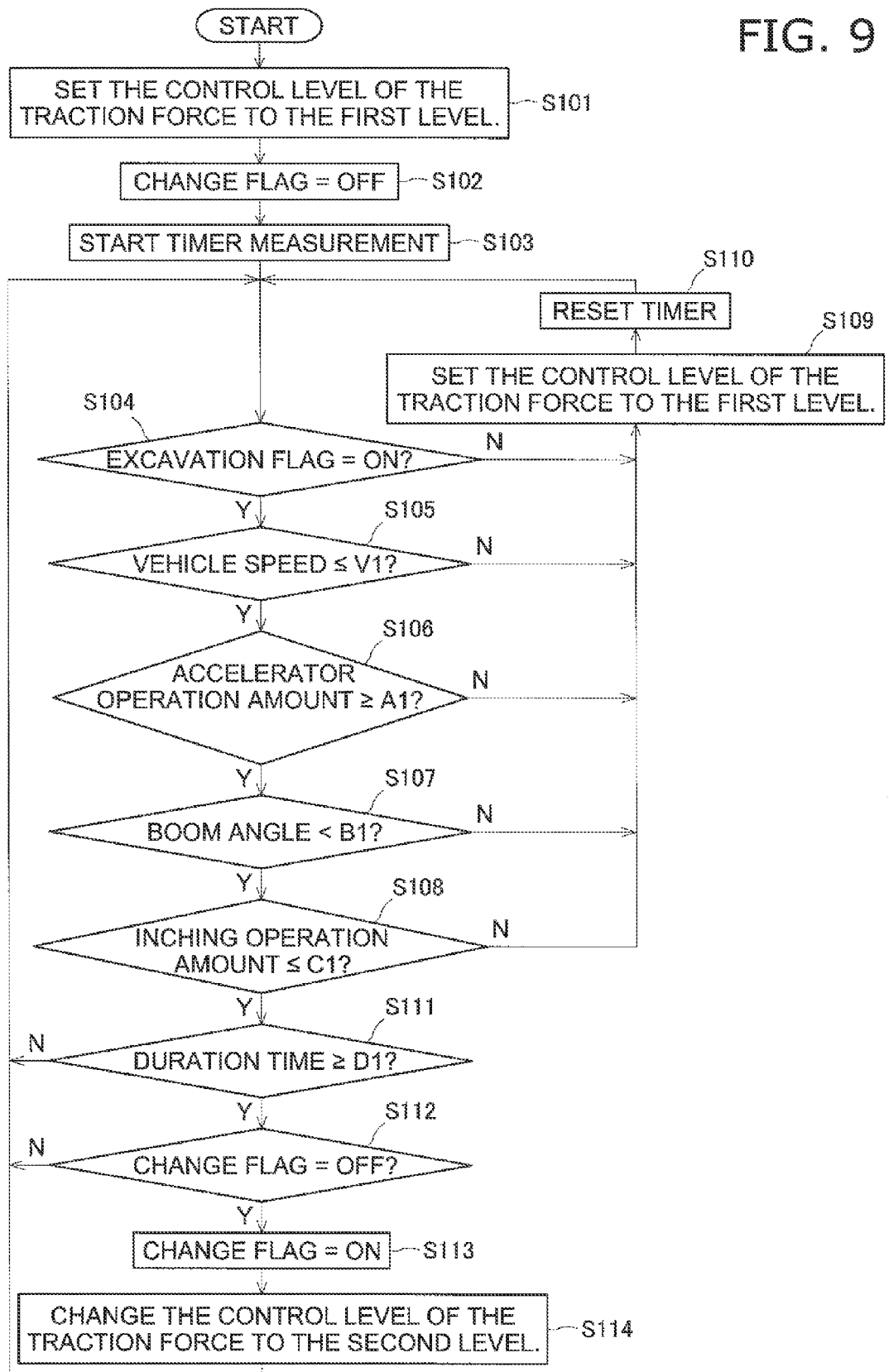
FIG. 9 is a flow chart showing a determination processing for automatically increasing a maximum traction force during a traction force control.

As is shown in FIG. 8, the vehicle body controller 12, has a traction force controlling section 61, an aspect of operation determining section 62, a vehicle speed determining section 63, an accelerator operation determining section 64, a boom angle determining section 65, an inching operation determining section 66, a duration time determining section 67, and a change flag determining section 68. FIG. 9 is a flow chart showing the determination processing for changing the control level of the traction force from the first level to the second level during the traction force control. The vehicle body controller 12, when the traction force control is set to the ON state by operating the traction force control operating member 15, executes the processing shown in FIG. 9.

In Step S101, the traction force controlling section 61 sets the control level of the traction force to the first level. In addition, in Step S102, the traction force controlling section 61 sets the change flag to OFF. The change flag is set to ON when the control level of the traction force is to be increased to the second level from the first level. The change flag is set to OFF when the control level of the traction force is not to be increased to the second level from the first level. In other words, when the change flag is OFF, the traction force controlling section 61 maintains the control level of the traction force at the first level. Further, in Step S103, the traction force controlling section 61 starts timer measurement. The timer measures the duration time during which the determination conditions described later are being satisfied. The determination conditions are the conditions for increasing the control level of the traction force from the first level to the second level.

Next, in Step S104, the aspect of operation determining section 62 determines whether or not the excavation flag is ON. The excavation flag being ON implies that the operation aspect is excavation. The aspect of operation determining section 62, based on the traveling state of the vehicle and the operating state of the work implement 52, determines whether or not the aspect of operation is excavation. The aspect of operation determining section 62, when the aspect of operation is determined to be excavation, sets the excavation flag to ON. The aspect of operation determining section 62, when the aspect of operation is determined to be other than excavation, sets the excavation flag to OFF. The concrete processing of determining the aspect of operation is described later.

In Step S105, the vehicle speed determining section 63 determines whether or not the vehicle speed is less than or equal to a vehicle speed threshold value V1. The vehicle speed determining section 63 carries out the above determination based on the detected signal from the vehicle speed sensor 16. The vehicle speed threshold value V1 is a small value so that it is possible to deem that the vehicle has stopped. For example, the vehicle speed threshold value V1 is equal to or less than 2 km/h. The vehicle speed threshold value V1 is (preferably equal to or less than 1 km/h.

In Step S106, the accelerator operation determining section 64 determines whether or not the accelerator operation amount is equal to or more than a prescribed accelerator threshold value A1. The accelerator operation determining section 64 carries out the above determination based on the detected signal from the accelerator operation amount sensor 13. The accelerator threshold value A1 is a large value so that it is possible to deem that the accelerator operating member 13*a* has been operated to the maximum limit. The accelerator threshold value A1 is a value larger than the threshold value A2 (see FIG. 7) described above. For example, when the maximum value of the accelerator operation amount is taken as 100%, the accelerator threshold value A1 is, preferably, 80% or more, and more preferably, the accelerator threshold value A1 is 90% or more.

Figure 10:
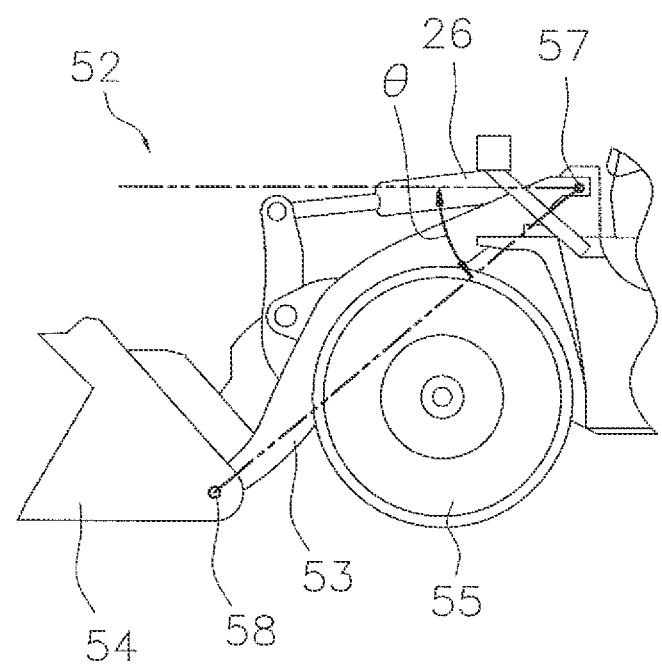
FIG. 10 is a side view drawing of a work implement for showing the definition of a boom angle.

In Step S107, the boom angle determining section 65 determines whether or not the boom angle is less than a prescribed angle threshold value B1. The boom angle determining section 65 carries out the above determination based on the detection signal from the boom angle detection section 38. The boom angle, as is shown in FIG. 10, in the side view, taking the horizontal direction as 0 degrees, is the angle θ between the line joining the boom pin 57 and the bucket pin 58 and the horizontal direction. An angle below the horizontal direction is taken to have a negative value, and an angle above the horizontal direction is taken to have a positive value. The boom angle is defined so that it increases in the upward direction. The angle threshold value B1 corresponds to the boom angle that can be present during an excavation operation. For example, the angle threshold value B1 is equal to or less than 0 degrees. Preferably, the angle threshold value B1 is equal to or less than −10 degrees. This is because, when the boom angle larger than 0 degrees, the boom has been lifted up to a position above the horizontal, and in such a state, compared to when the boom has been pushed inside earth and sand, a large traction force is not required.

in Step S108, the inching operation determining section 66 determines whether or not the inching operation amount is equal to or less than a prescribed inching operation threshold value C1. The inching operation threshold value C1 is a small value so that it can be deemed that the inching operating member 27*a* has not been operated. For example, if the maximum value of the inching operation amount is taken as 100%, it is preferable that the inching operation threshold value C1 is equal to or less than 20%. More preferably, the inching operation threshold value C1 is equal to or less than 15%.

When at least one of the conditions from Step S104 to Step S108 is not satisfied, the processing proceeds to Step S109. In Step S109, the traction force controlling section 61 sets the control level of the traction force to the first level. In other words, when at least one of the conditions from Step S104 to Step S108 is not satisfied in a state that the control level of the traction force is at the first level, the control level of the traction force is maintained at the first level. When at least one of the conditions from Step S104 to Step S108 is no longer satisfied in a state that the control level of the traction force is at the second level, the control level of the traction force is reverted to the first level from the second level. Therefore, the traction force controlling section 61 does not increase the maximum traction force when the aspect of operation is not excavation. The traction force controlling section 61 does not increase the maximum traction force when the vehicle speed is not equal to or less than the prescribed speed threshold value V1. The traction force controlling section 61 does not increase the maximum traction force when the amount of operation of the accelerator operating member is not equal to or more than the prescribed operation threshold value A1. The traction force controlling section 61 does not increase the maximum traction force when the boom angle is not less than the prescribed angle threshold value B1. The traction force controlling section 61 does not increase the maximum traction force when the amount of operation of the inching operating member 27*a* is not less than or equal to the prescribed inching threshold value C1. Further, the timer is reset in Step S110.

When all the conditions from Step S104 to Step S108 are satisfied, the processing proceeds to Step S111. In Step S111, the duration time determining section 67 determines whether or not the time measured by the timer is equal to or more than the prescribed time threshold value DI. In other words, the duration time determining section 67 determines whether or not the continuous period of time during which the state in which all of the conditions in Step A104 to Step S108 are being satisfied is equal to or more than the prescribed time threshold value D1. The time threshold value D1 is set to a time so that it is possible to deem that the different conditions are not being satisfied only temporarily. For example, the time threshold value D1 is a value of 1 second or less. Preferably, the time threshold value D1 is a value of 0.5 seconds or less. When the time measured by the timer is not equal to or more than D1, the determinations from Step S104 to Step S112 are repeated. In other words, the traction force controlling section 61 does not increase the maximum traction force until the duration time reaches the prescribed time threshold value D1.

Further, in Step S112, the change flag determining section 68 determines whether or not the change flag is OFF. In other words, the change flag determining section 68 determines whether or not the control level of the traction force is the first level. When the change flag is OFF, that is, when the control level of the traction force is the first level, the processing proceeds to Step S113.

In Step S113, the traction force controlling section 61 sets the change flag to ON. Further, in Step S114, the traction force controlling section 61, changes the control level of the traction force from the first level to the second level. Because of this, the traction fierce controlling section 61 controls the maximum traction force based on the second traction force ratio information shown in FIG. 7. However, as is shown in FIG. 7, the maximum traction force of the second level is less than the maximum action force when the traction force control is in the OFF state.

Figure 11:
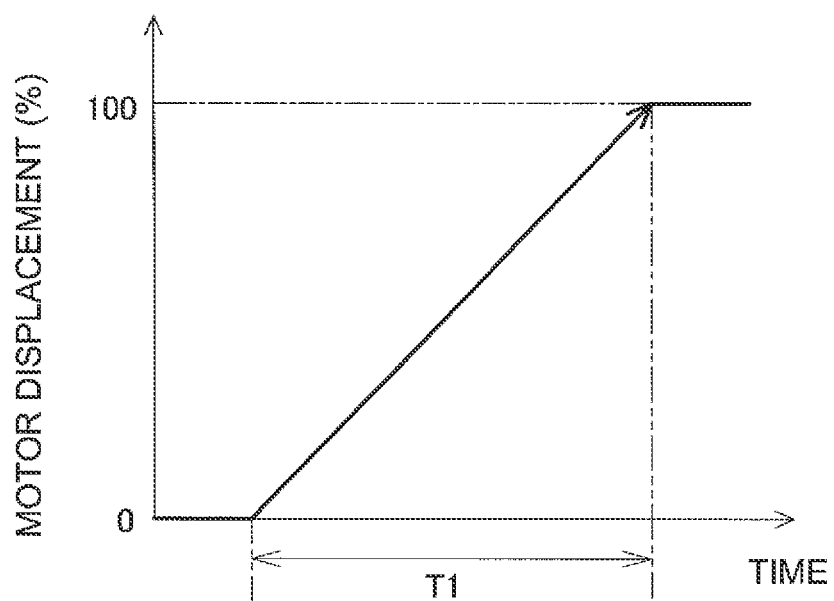
FIG. 11 is a diagram showing a speed of change of an instruction value of a motor displacement when the motor displacement is changed.
Figure 11:
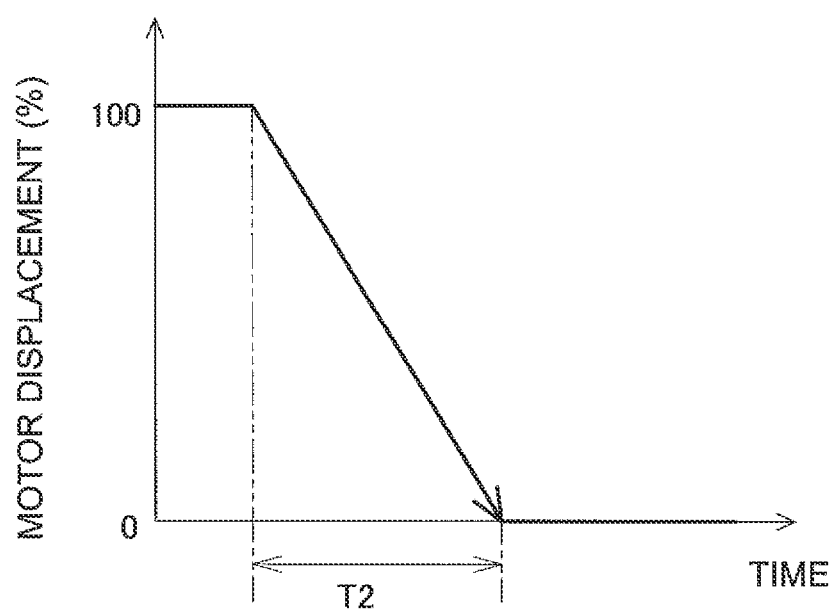

When the traction force controlling section 61 changes the control level of the traction force from the first level to the second level, it changes the maximum traction force more slowly than when reverting from the second level to the first In other words, the traction force controlling section 61, when increasing the maximum traction force during the traction force control, changes the traction force more slowly than when reducing the maximum traction force. FIG. 11(*a*) shows the speed of change of the instruction value of the motor displacement when the motor displacement is increased. In other words, FIG. 11(*a*) shows the speed of change of the instruction value of the motor displacement when the maximum traction force is increased. FIG. 11(*b*) shows the speed of change of the instruction value of the motor displacement when the motor displacement is decreased. In other words, FIG. 11(*b*) shows the speed of change of the instruction value of the motor displacement when the maximum traction force is decreased. As is shown in FIG. 11, the time interval T1 is larger than the time interval T2. Therefore, the traction force controlling section 61, when increasing the maximum traction force, changes the instruction value of the motor displacement more slowly than when reducing the maximum traction force.

Further, in Step S112 shown in FIG. 9, when the change flag is not OFF, not only the control level of the traction force is maintained at the second level, but also the determinations in Step S104 to Step S112 are repeated. Further, when any one of the conditions in Step S104 to Step S108 is no longer satisfied, in Step S109, the control level of the traction force is reverted to the first level from the second level.

Figure 12:
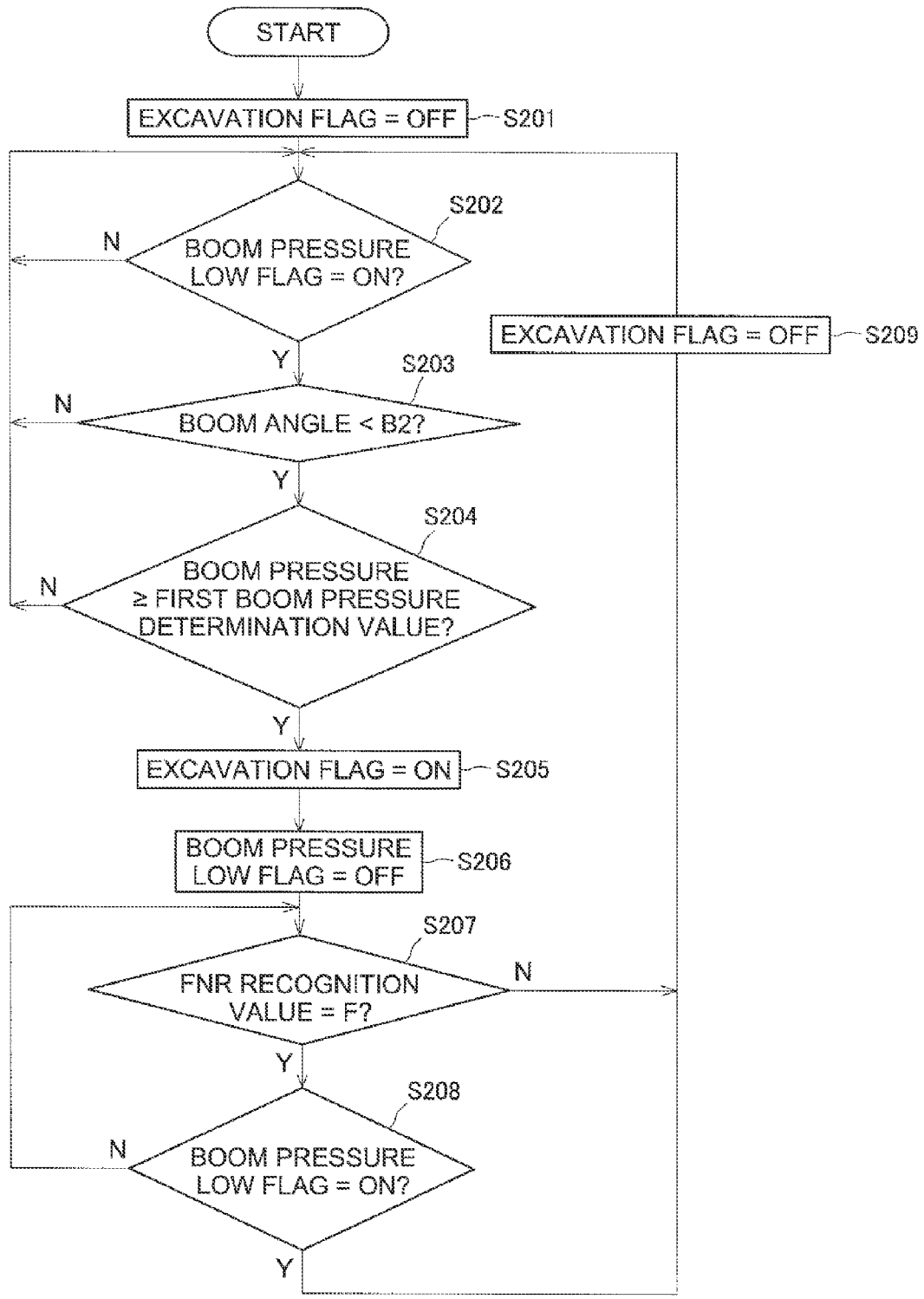
FIG. 12 is a flow chart showing a processing for determining whether or not an aspect of operation is excavation.

FIG. 12 shows a flow chart of the processings for determining whether or not the excavation flag is ON. In other words, FIG. 12 is a flow chart showing the processing for determining whether or not the aspect of operation is excavation. As is shown in FIG. 12, in Step S201, the aspect of operation determining section 62 sets the excavation flag to OFF. In Step S202, the aspect of operation determining section 62 determines whether or not the boom pressure low flag is ON. The boom pressure low flag being ON indicates that the bucket 54 is in the empty load state. The processing of determining the boom pressure low flag is described later.

In Step S203, a determination is made as to whether or not the boom angle is less than a prescribed angle threshold value B2. The angle threshold value B2 corresponds to the boom angle when the bucket is placed on the ground. The angle threshold value B2 is less than the angle threshold value B1 described above.

In S204, the aspect of operation determining section 62 determines whether or not the boom pressure is equal to or more than the first boom pressure determination value. The boom pressure is the hydraulic pressure supplied to the lifting cylinder 19 when extending the lifting cylinder 19. The boom pressure is detected by the boom pressure sensor 22 described above. The first boom pressure determination value is the value of the boom pressure that can be present during excavation. The first boom pressure determination value is set by obtaining it through experiments or simulations carried out in advance. The first boom pressure determination value is a value corresponding to the boom angle. The vehicle body controller 12 stores the boom pressure determining value information (hereinafter referred to as the "first boom pressure determining value information"). The first boom pressure determining value information, for example, is a table or a map showing the relationship between the first boom pressure determining value and the boom angle. The aspect of operation determining section 62, by referring to the first boom pressure determining value information, determines the first boom pressure determining value corresponding to the boom angle.

When all the conditions from Step S202 to Step S204 are satisfied, the processing proceeds to Step S205. In Step S205, the aspect of operation determining section 62 sets the excavation flag to ON. In other words, the aspect of operation determining section 62 determines that the aspect of operation is excavation when all the conditions from Step S202 to Step S204 are satisfied, This is because when all the conditions from Step S202 to Step S204 are satisfied, it is possible to deem that the wheel loader 50 has entered the preparation stage before excavation. When at least one condition among the conditions of Step S202, S203, and S204 is not satisfied, the determining in Step S202 to Step S204 is repeated.

Further, in Step S206, the aspect of operation determining section 62 sets the boom pressure low flag to OFF. Next, in Step S207, the aspect of operation determining section 62 determines whether the FNR recognition value is F or not. The FNR recognition value is information indicating in which of the three states of forward travel state, reverse travel state, and neutral state is the vehicle in. The FNR recognition value being F means that the vehicle is in the forward travel state. The FNR recognition value being R means that the vehicle is in the reverse travel state. The FNR recognition value being N means that the vehicle is in the neutral state. The aspect of operation determining section 62, based on the detected signal from the forward-reverse travel selection operating member 14, determines whether the FNR recognition value is F or not. When the FNR. recognition value is not F, the processing proceeds to Step S209. In Step S209, the aspect of operation determining section 62 sets the excavation flag to OFF. In other words, when the vehicle is in the reverse travel or in the neutral state, the excavation flag is set to OFF. In Step S207, if the FNR, recognition value is F the processing proceeds to Step S208.

In Step S208, the aspect of operation determining section 62 determines whether or not the boom pressure low flag is ON. If the boom pressure low flag is ON, the processing proceeds to Step S209. If the boom pressure low flag is not ON, the processing returns to Step S207. Therefore, once the aspect of operation is determined to be excavation, after that, until the forward-reverse travel selection operating member 14 is switched from the forward travel position to the reverse travel position, or, until the forward-reverse travel selection operating member 14 is switched from the forward travel position to the neutral position, even if the conditions from Step S202 to Step S204 are not satisfied, the ON state of the excavation flag is maintained. Further, even if the forward-reverse travel selection operating member 14 is being maintained in the forward travel position, when the boom pressure low flag is set to ON, the excavation flag will be changed to OFF.

Figure 13:
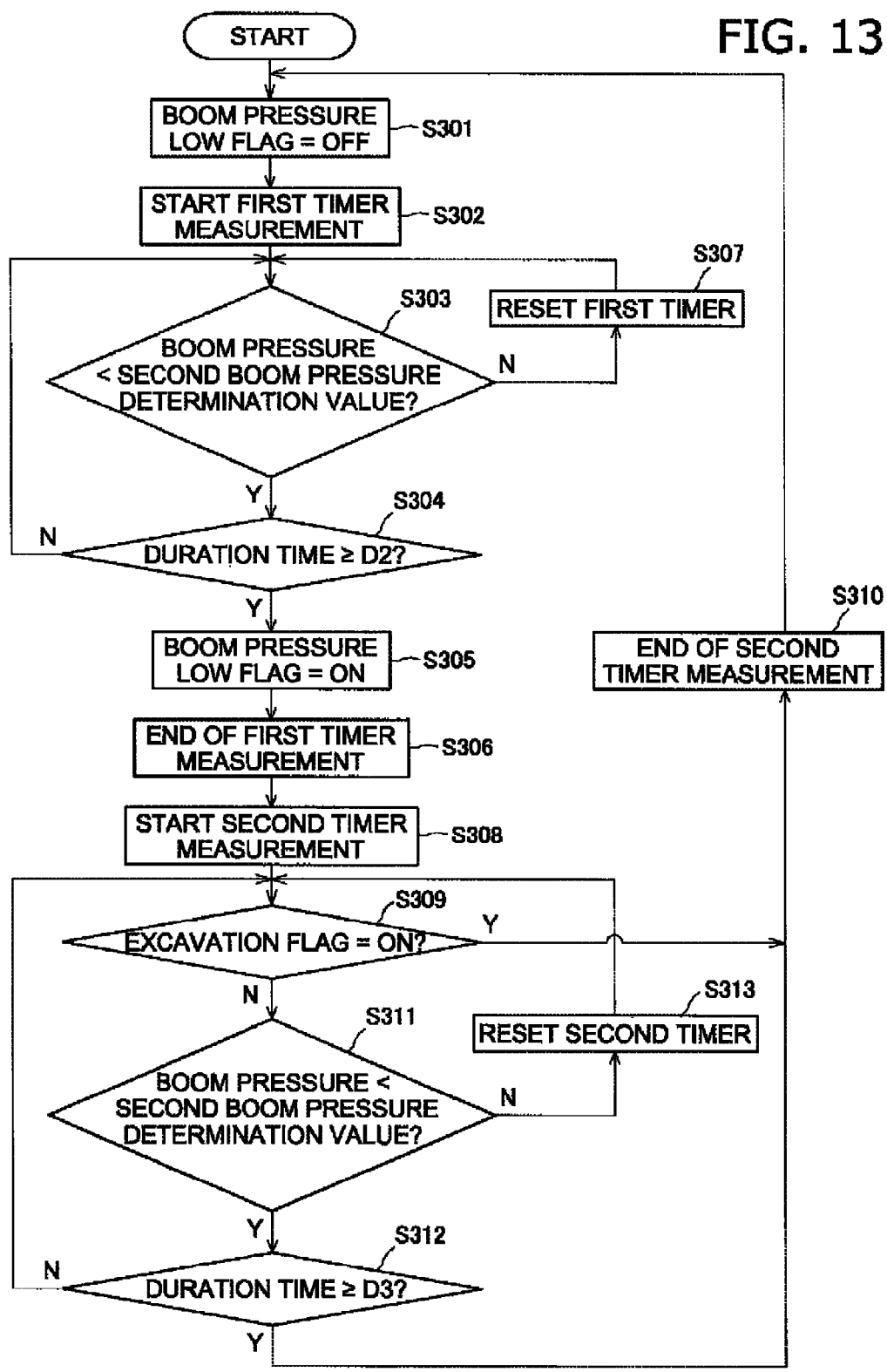

FIG. 13 is a flow chart showing the processing for determining whether or not the boom pressure low flag is ON. As is shown in FIG. 13, in Step S301, the aspect of operation determining section 62 sets the boom pressure low flag to OFF.

In Step S302, the aspect of operation determining section 62 starts the timer measurement. Here, the timer measures the duration time during which the conditions for setting the boom pressure low flag to ON are being satisfied.

In Step S303, the aspect of operation determining section 62 determines whether or not the boom pressure is less than the second boom pressure determination value. The second boom pressure determination value is the value of the boom pressure that can be taken when the bucket is in the empty load state. The aspect of operation determining section 62 stores the boom pressure determination value information (hereinafter referred to as the "second boom pressure determination value information) showing the relationship between the second boom pressure determination value and the boom angle. The second boom pressure determination value information, for example, is a table or a map showing the relationship between the second boom pressure determination value and the boom angle. The aspect of operation determining section 62, by referring to the second boom pressure determination value information, determines the second boom pressure determination value according to the boom angle. In the second boom pressure determination value information, when the boom angle is larger than 0 degrees, the second boom pressure determination value remains constant at the value when the boom angle is 0 degrees. This is because the rate of increase of the boom pressure when the boom angle is larger than 0 degrees is less than the rate of increase of the boom pressure when the boom angle is less than 0 degrees, and the second boom pressure determination value for boom angles larger than 0 can be approximated by the second boom pressure determination value when the boom angle is 0.

In Step S304, the aspect of operation determining section 62 determines whether or not the time measured by a first timer is equal to or more than a prescribed time threshold value D2. In other words, the duration time determining section 67 determines whether or not the duration time over which the condition of Step S303 is satisfied is equal to or more than the prescribed time threshold value D2. The time threshold value D2 is set to a time duration value so that it is possible to deem that the condition of Step S303 is not being satisfied temporarily. The prescribed time threshold value D2 is larger than the prescribed time threshold value D1 described above. When the time measured by the timer is not equal to or more than the prescribed time threshold value D2, the determination of Step S303 is repeated. in Step S304, if the time measured by the timer is equal to or more than the prescribed time threshold value D2, the processing proceeds to Step S305, In Step S305, the aspect of operation determining section 62 sets the boom pressure low flag to ON. Next, in Step S306, the aspect of operation determining section 62 ends the measurement by the first timer. Further, in Step S303, if the boom pressure is not less than the second boom pressure determination value, the processing proceeds to Step S307. In Step S307, the aspect of operation determining section 62 resets the first timer.

In Step S308, the aspect of operation determining section 62 starts the measurement by a second timer. Next, in Step S309, the aspect of operation determining section 62 determines whether or not the excavation flag is ON. If the excavation flag is ON, the processing proceeds to Step S310.

In Step S310, the aspect of operation determining section 62 ends the measurement by the second timer. Next, the processing returns to Step S301, and the aspect of operation determining section 62 sets the boom pressure low flag to OFF.

In Step S309, if the excavation flag is not ON, the processing proceeds to Step S311. In Step S311, the aspect of operation determining section 62 determines whether or not the boom pressure is lower than the second boom pressure determination value. If the boom pressure is less than the second boom pressure determination value, the processing proceeds to Step S312.

In Step S312, the aspect of operation determining section 62 determines whether the time measured by the second timer is equal to or more than a prescribed time threshold value D3. If the time measured by the second timer is equal to or more than the prescribed time threshold value D3, the processing proceeds to Step S310. Similar to the above description, in Step S310, the aspect of operation determining section 62 ends the measurement by the second timer, and in Step S301 sets the boom pressure low flag to OFF. In Step S312, if the time measured by the second timer is not equal to or more than the prescribed threshold time D3, the processing returns to Step S309.

Further, in Step S312, if the boom pressure is not less than the second boom pressure determination value, the processing proceeds to Step S313. In Step S313, the aspect of operation determining section 62 resets the timer and returns the processing to Step S309.

In the wheel loader 50 according to the present embodiment, when the determination conditions described above are satisfied during the traction force control, the control level of the traction force is increased from the first level to the second level. Because of this, the maximum traction force is increased. The determination conditions are satisfied, during an excavation operation, in spite of an operator operating the accelerator operating member wanting to obtain a large traction force, when the wheel loader 50 is in an almost stopped state. Therefore when wheel loader 50 goes into such a state, even if the operator does not release the traction force control, the maximum traction force is automatically increased. Because of this, in the wheel loader 50 according to the present embodiment, it is not only possible to obtain sufficient traction force during excavation operations, but also possible to suppress reductions in the operability.

In the determination processing described above, the duration time over which the determination conditions are satisfied is considered. Because of this, it is possible to prevent changes in the control level being repeated frequently within a short time. Because of this, reductions in the operability of the wheel loader 50 are suppressed.

Although the traction force controlling section 61 increases the control level of the traction force from the first level to the second level when the determination conditions are satisfied, the maximum traction force of the second level is less than the maximum traction force when the traction force control is in the OFF state. Therefore, when the determination conditions are satisfied, it is possible to prevent the maximum traction force from becoming excessively large.

The operator, by operating the settings operating device 24, can change the magnitude of the maximum traction force of the first level. Further, if the determination conditions are satisfied, the traction force controlling section 61 increases the maximum traction force to a value larger than the maximum traction force of the first level. Because of this, according to the operating conditions, the operator can set in more detail the necessary maximum traction force.

When the determination conditions are no longer satisfied during the traction force control, the traction force controlling section 61 reverts the control level of the traction force to the first level. Because of this, it is possible to obtain an appropriate maximum traction force according to the operating conditions.

When the traction force controlling section 61 increases the control level of the traction force from the first level to the second level, it changes the pump displacement more slowly than when reverting from the second level to the first level. Because of this, it is possible to suppress sudden increases in the traction force. Because of this, it is possible to suppress the occurrence of slipping, or reductions in the operability. In addition, the traction force controlling section 61, when reverting the control level of the traction force from the second level to the first level, it changes the pump displacement more quickly than when increase from the first level to the second level. Because of this, in the wheel loader 50 according to the present embodiment, for example, even when the boom goes into a state during excavation in which it cannot rise because of the traction force becoming too large, it is possible to quickly escape from such a state.

Although an embodiment of the present invention has been described above, the present invention is not limited to the above embodiment, and it is possible to make various changes without deviating from the scope and intent of the present invention.

In the above embodiment, explanations are given taking the example of a wheel loader 50 installed with a 1-pump 1-motor HST system having one hydraulic pump and a hydraulic motor 10 for travel. However, the present invention is not limited to this. For example, it is also possible to apply the present invention to a wheel loader installed with a 1-pump 2-motor HST system having one hydraulic pump and two hydraulic motors for travel.

In the above embodiment, the inching operating member 27a also functions as a brake pedal. However, it is also possible to provide an inching operating member as a separate member other than a brake pedal.

In the above embodiment, the settings operation device 24 can change the magnitude of the maximum traction force of the first level in three steps. However, the settings operation device 24 may also be able to change the magnitude of the maximum traction force of the first level in a plurality of steps other than three steps. Or else, the settings operation device 24 may also be able to change the magnitude of the maximum traction force of the first level to arbitrary magnitude in a continuous manner, Or else, the settings operation device 24 can also be omitted. in other words, it is also possible that the magnitude of the maximum traction force of the first level is unchangeable.

The determination conditions need not be restricted to the above conditions, and it is also possible to add other conditions. Or else, it is also possible that a part or parts of the above conditions are changed.

In the above embodiment, although the traction force controlling section 61 is reducing the maximum traction force by changing the upper limit displacement of the motor displacement, it is also possible to reduce the maximum traction force by some other method. For example, the traction force controlling section 61 can also reduce the maximum traction force by controlling the drive circuit pressure. The drive circuit pressure can be controlled by controlling the displacement of the first hydraulic pump 4.

In the above embodiment, although the traction force ratio information has been set so that the traction force ratio increases according to increases in the accelerator operation amount, it is also possible to set the traction force ratio information so that the traction force ratio becomes a constant irrespective of the accelerator operation amount.

According to the illustrated embodiment, it is possible to provide a wheel loader and a method for controlling a wheel loader whereby it is not only possible to obtain sufficient traction force during excavation operation, but also to suppress reductions in operability.

The invention claimed is:

1. A wheel loader comprising:
a work implement including a boom and a bucket;
an engine;
a hydraulic pump configured to be driven by the engine;
a hydraulic motor for travel configured to be driven by a hydraulic fluid ejected from the hydraulic pump;
an accelerator operating member configured to be operated to set a target rotational speed of the engine;
an inching operating member configured to be operated to reduce a vehicle speed;
a traction force control operating member configured to be operated to switch ON or OFF of a traction force control for reducing a maximum traction force;
a vehicle speed detecting section configured to detect the vehicle speed;
an aspect of operation determining section configured to determine whether or not an aspect of operation is excavation;
a vehicle speed determining section configured to determine whether or not the vehicle speed is less than or equal to a prescribed speed threshold value;
an accelerator operation determining section configured to determine whether or not an amount of operation of the accelerator operating member is equal to or more than a prescribed accelerator threshold value;
an inching operation determining section configured to determine whether or not an amount of operation of the inching operating member is less than or equal to a prescribed inching operation threshold value; and
a traction force control section configured to reduce the maximum traction force when the traction force control is in an ON state compared to the maximum traction force when the traction force control is in an OFF state;
wherein, the traction force control section is configured to increase the maximum traction force when determination conditions are satisfied during the traction force control, the determination conditions including conditions that the aspect of operation is excavation, the vehicle speed is less than or equal to the prescribed speed threshold value, the amount of operation of the accelerator operating member is equal to or more than the prescribed accelerator threshold value, and the amount of operation of the inching operating member is less than or equal to the prescribed inching operation threshold value.

2. The wheel loader according to claim 1, further comprising
a boom angle determining section configured to determine whether or not a boom angle, which is an angle of the boom with respect to a horizontal direction, is less than a prescribed angle threshold value,
wherein the determination conditions further include a condition that the boom angle is less than the prescribed angle threshold value.

3. The wheel loader according to claim 1, wherein
the determination conditions further include a condition that a duration time of the other conditions being satisfied is equal to or more than a prescribed time threshold value.

4. The wheel loader according to claim 1, wherein
the traction force control section, during the traction force control, is configured to set a control level of the traction force to a first level of which the maximum traction three becomes less than the maximum traction force when the traction three control is in the OFF state, and
the traction force control section, when the determination conditions are satisfied during the traction force control, is configured to change the control level of the maximum traction force to a second level of which the maximum traction force becomes larger than the maximum traction force of the first level.

5. The wheel loader according to claim 4, wherein
the maximum traction force of the second level is less than the maximum traction force when the traction force control is in the OFF state.

6. The wheel loader according to claim 4, further comprising
a traction force level changing section configured to change a magnitude of the maximum fraction force of the first level.

7. The wheel loader according to claim 4, wherein
the traction force control section, when the determination conditions are no longer satisfied during the traction force control, is configured to revert the control level of the traction force to the first level.

8. The wheel loader according to claim 7, wherein
the traction force control section, when changing the control level to the second level, is configured to change the traction force more slowly than when reverting the control level of the traction force to the first level.

9. The wheel loader according to claim 1, wherein
the aspect of operation determining section is configured to determine whether the aspect of operation is excavation or not based on a traveling state of the wheel loader and an operating state of the work implement.

10. The wheel loader according to claim 1, wherein
the traction force control section is configured control the displacement of the hydraulic motor for travel by controlling an angle of inclination of the hydraulic motor for travel, and to control the maximum traction force by controlling the upper limit displacement of the hydraulic motor for travel.

11. The wheel loader according to claim 1, wherein
the traction force control section is configured not to increase the maximum traction force when the aspect of operation is not excavation.

12. The wheel loader according to claim 1, wherein
the traction force control section is configured not to increase the maximum traction force when the vehicle speed is not less than or equal to the prescribed speed threshold value.

13. The wheel loader according to claim 1, wherein
the traction force control section is configured not to increase the maximum traction force when the amount of operation of the accelerator operating member is not equal to or more than the prescribed accelerator threshold value.

14. The wheel loader according to claim 1, wherein
the traction force control section is configured not to increase the maximum traction force when the amount of operation of the inching operating member is not less than or equal to the prescribed inching operation threshold value.

15. The wheel loader according to claim 2, wherein
the traction force control section is configured not to increase the maximum traction force when the boom angle is not less than the prescribed angle threshold value.

16. The wheel loader according to claim 3 wherein,
the traction force control section is configured not to increase the maximum traction force when the duration time is not equal to or more than the prescribed time threshold value.

17. A method for controlling a wheel loader including
a work implement including a boom and a bucket,
an engine,
a hydraulic pump configured to be driven by the engine,
a hydraulic motor for travel configured to be driven by a hydraulic fluid ejected from the hydraulic pump,
an accelerator operating member configured to be operated to set a target rotational speed of the engine,
an inching operating member configured to be operated to reduce a vehicle speed,
a traction force control operating member configured to be operated to switch ON or OFF of a traction force control for reducing a maximum traction force,
the method comprising:
detecting the vehicle speeds;
determining whether or not an aspect of operation is excavation;
determining whether or not the vehicle speed is less than or equal to a prescribed speed threshold value;
determining whether or not an amount of operation of the accelerator operating member is equal to or more than a prescribed accelerator threshold value;
determining whether or not an amount of operation of the inching operating member is less than or equal to a prescribed inching operation threshold value;
when the traction force control is in an ON state, reducing the maximum traction force compared to the maximum traction force when the traction force control is in an OFF state; and
increasing the maximum traction force when determination conditions are satisfied during the traction force control wherein, the determination conditions include conditions that the aspect of operation is excavation, the vehicle speed is less than or equal to the prescribed speed threshold value, the amount of operation of the accelerator operating member is equal to or more than the prescribed accelerator threshold value, and the amount of operation of the inching operating member is less than or equal to the prescribed inching operation threshold value.

* * * * *